United States Patent
Kano et al.

(10) Patent No.: US 10,793,976 B2
(45) Date of Patent: Oct. 6, 2020

(54) DYEABLE POLYOLEFIN FIBER AND FIBROUS STRUCTURE COMPRISING SAME

(71) Applicant: Toray Industries, Inc., Tokyo (JP)

(72) Inventors: Hidekazu Kano, Mishima (JP); Shogo Hamanaka, Mishima (JP); Katsuhiko Mochizuki, Mishima (JP)

(73) Assignee: Toray Industries, Inc., Tokyo (JP)

( * ) Notice: Subject to any disclaimer, the term of this patent is extended or adjusted under 35 U.S.C. 154(b) by 119 days.

(21) Appl. No.: 16/084,199

(22) PCT Filed: Feb. 28, 2017

(86) PCT No.: PCT/JP2017/007733
§ 371 (c)(1),
(2) Date: Sep. 11, 2018

(87) PCT Pub. No.: WO2017/154665
PCT Pub. Date: Sep. 14, 2017

(65) Prior Publication Data
US 2019/0071797 A1 Mar. 7, 2019

(30) Foreign Application Priority Data

Mar. 11, 2016 (JP) .................. 2016-047932
Aug. 2, 2016 (JP) .................. 2016-151912

(51) Int. Cl.
*D01F 8/06* (2006.01)
*D01F 1/10* (2006.01)
*C08G 63/199* (2006.01)
*D01F 6/46* (2006.01)
*D01F 8/14* (2006.01)
*D01D 5/36* (2006.01)
*C08G 63/18* (2006.01)

(52) U.S. Cl.
CPC ............ *D01F 8/06* (2013.01); *C08G 63/199* (2013.01); *D01F 1/10* (2013.01); *D01F 6/46* (2013.01); *C08G 63/18* (2013.01); *D01D 5/36* (2013.01); *D01F 8/14* (2013.01); *D10B 2401/14* (2013.01)

(58) Field of Classification Search
CPC ..... D01F 8/06; D01F 8/16; D01F 8/14; D01F 6/46; D01F 6/04; D01F 1/10; Y10T 442/367; Y10T 428/249938; Y10T 428/2929; Y10T 442/64; D04H 1/4391; D10B 2401/14; D10B 2321/022; D10B 2331/042; D01D 5/30; D01D 5/38; D01D 5/247; D01D 5/36
USPC ............ 442/361; 428/373, 374; 264/177.13; 521/138, 139; 525/177, 184, 57, 190
See application file for complete search history.

(56) References Cited

U.S. PATENT DOCUMENTS

| 6,132,868 A | 10/2000 | Dean et al. |
| 2003/0035951 A1* | 2/2003 | Magill ................ D01F 1/10 428/373 |
| 2012/0260436 A1 | 10/2012 | Oka et al. |

FOREIGN PATENT DOCUMENTS

| JP | 4-209824 A | 7/1992 |
| JP | 7-90783 A | 4/1995 |
| JP | 2001-522947 A | 11/2001 |
| JP | 2008-533315 A | 8/2008 |
| JP | 2012-219385 A | 11/2012 |
| JP | 2014-37646 A | 2/2014 |
| KR | 100386742 * | 7/2002 |
| WO | 2011/068195 A1 | 6/2011 |
| WO | WO-2013141033 A1 * | 9/2013 ............... D01F 6/04 |

* cited by examiner

*Primary Examiner* — Camie S Thompson
(74) *Attorney, Agent, or Firm* — DLA Piper LLP (US)

(57) ABSTRACT

A dyeable polyolefin fiber includes a sea-island structure in which a polyolefin (A) is the sea component and a copolyester (B) obtained by copolymerizing cyclohexanedicarboxylic acid is the island component, the polyolefin fiber characterized in that the dispersion diameter of the island component in a lateral cross section of the fiber is 30 to 1000 nm. The dyeable polyolefin fiber is bright, deep coloring is imparted to the lightweight polyolefin fiber, oxidative decomposition during tumbler drying and yellowing during long-term storage are minimized, and the polyolefin fiber can be suitably used as a fibrous structure.

13 Claims, No Drawings

DYEABLE POLYOLEFIN FIBER AND FIBROUS STRUCTURE COMPRISING SAME

TECHNICAL FIELD

This disclosure relates to a dyeable polyolefin fiber. Particularly, this disclosure relates to a dyeable polyolefin fiber in which vivid and deep color developability has been provided to a polyolefin fiber inherently superior in lightweight property and which can be suitably employed as a fibrous structure because its oxidative decomposition during tumbler drying and its yellowing during long-term storage are suppressed.

BACKGROUND

Polyethylene fibers and polypropylene fibers, which fall under the category of polyolefin-based fibers, are superior in lightweight property and chemical resistance, but have the disadvantage of being difficult to dye due to the absence of polar functional groups. These defects make them unsuitable as clothing material and accordingly they are currently used in a limited range of applications including interior materials such as tile carpets, household carpets, and automobile mats, and general materials such as ropes, protective nets, filter fabrics, narrow tapes, braids, and chair upholstery.

Adding a pigment is a simple dyeing method for polyolefin-based fibers. The use of a pigment, however, cannot serve stably to develop vivid colors or light colors compared to the use of a dye, and there is the disadvantage that pigments tend to stiffen fibers, leading to products with low softness.

As a dyeing method to replace the use of pigments, there is a proposal of surface modification of polyolefin-based fibers. For example, Japanese Patent Laid-open Publication No. H07-90783 describes an attempt at improving dyeing properties through surface modification of polyolefin-based fibers by performing ozone treatment or ultraviolet ray irradiation to cause graft copolymerization of vinyl compounds.

In addition, there are proposals of techniques that combine a polyolefin with poor dyeing properties with a dyeable polymer to form a composite material. For example, in Japanese Patent Laid-open Publication No. H04-209824, there is proposed a dyeable polyolefin fiber in which polyester or polyamide is blended as a dyeable polymer into polyolefin.

Furthermore, in Japanese Translation of PCT International Publication No. 2008-533315 and Japanese Translation of PCT International Publication No. 2001-522947, attempts are made to improve the color developability by rendering dyeable polymers to be blended into polyolefins amorphous. Specifically, a dyeable polyolefin fiber in which a copolymerized polyester with cyclohexanedimethanol copolymerized is blended as a dyeable amorphous polymer into polyolefin is proposed in Japanese Translation of PCT International Publication No. 2008-533315 and a dyeable polyolefin fiber in which a copolymerized polyester with isophthalic acid and cyclohexanedimethanol copolymerized is blended as a dyeable amorphous polymer into polyolefin is proposed in Japanese Translation of PCT International Publication No. 2001-522947.

The method described in Japanese Patent Laid-open Publication No. H07-90783, however, requires a long processing time for ozone treatment and ultraviolet ray irradiation, leading to low productivity and difficulties in industrialization.

In addition, in the method of Japanese Patent Laid-open Publication No. H04-209824, color developability can be imparted to a polyolefin fiber with a dyeable polymer, but since the dyeable polymer is crystalline, color developability is insufficient and the color lacks vividness and depth. In the methods of Japanese Translation of PCT International Publication No. 2008-533315 and Japanese Translation of PCT International Publication No. 2001-522947, although color developability is improved by rendering a dyeable polymer amorphous, vividness and depth are still insufficient.

There is thus a need to provide a dyeable polyolefin fiber in which vivid and deep color developability has been imparted to a polyolefin fiber inherently superior in lightweight property and which can be suitably employed as a fibrous structure because its oxidative decomposition during tumbler drying and its yellowing during long-term storage are suppressed.

SUMMARY

We thus provide a dyeable polyolefin fiber that is a polymer alloy fiber having an islands-in-the-sea structure including a polyolefin (A) as a sea component and a copolymerized polyester (B) with cyclohexanedicarboxylic acid copolymerized as an island component, in which the dispersion diameter of the island component in a lateral fiber cross section is 30 to 1000 nm.

Preferably, cyclohexanedicarboxylic acid is copolymerized at a ratio of 10 to 100 mol % relative to all dicarboxylic acid components in the copolymerized polyester (B).

It can preferably be adopted to include a compatibilizer (C), and the compatibilizer (C) is preferably one or more compounds selected from among a polyolefin-based resin, an acrylic resin, a styrene-based resin, and a conjugated diene-based resin each containing at least one functional group selected from among an acid anhydride group, a carboxyl group, a hydroxyl group, an epoxy group, an amino group, and an imino group, and is more preferably a styrene-ethylene-butylene-styrene copolymer containing at least one functional group selected from an amino group and an imino group.

The dyeable polyolefin fiber preferably contains the copolymerized polyester (B) in an amount of 3.0 to 20.0 parts by weight, and preferably contains the compatibilizer (C) in an amount of 0.1 to 10.0 parts by weight, per 100 parts by weight in total of the polyolefin (A), the copolymerized polyester (B), and the compatibilizer (C).

The dyeable polyolefin fiber preferably satisfies the condition that the maximum temperature of a sample thereof is 155° C. or less during a period when the sample is held in a constant temperature condition of 150° C. for 100 hours in a test according to the oxidative exotherm test method (acceleration method) of a polypropylene fiber specified by the Japan Chemical Fibers Association, the condition that the color fastness to nitrogen oxides measured according to JIS L0855 is class 4 or higher, and the condition that the phenolic yellowing measured according to ISO 105-X18 is class 3 or higher.

The dyeable polyolefin fiber preferably contains an antioxidant and preferably has a configuration that the antioxidant is at least one species selected from among a phenol-based compound, a phosphorus-based compound, and a hindered amine-based compound and the hindered amine-based compound is an aminoether type hindered amine-based compound.

The dyeable polyolefin fiber can suitably be adopted for a fibrous structure at least partly including it.

It is thus possible to provide a dyeable polyolefin fiber being a polyolefin resin inherently superior in lightweight property but having vivid and deep color developability and being inhibited from oxidative decomposition during tumbler drying or from yellowing during long-term storage. If processed into a fibrous structure, the dyeable polyolefin fiber produced can be used favorably as clothing material and in a wide range of applications that require lightweight property and color developability in addition to interior and general material applications where conventional polyolefin-based fibers have been used.

DETAILED DESCRIPTION

The dyeable polyolefin fiber is a polymer alloy fiber having an islands-in-the-sea structure including a polyolefin (A) as a sea component and a copolymerized polyester (B) with cyclohexanedicarboxylic acid copolymerized as an island component in which the dispersion diameter of the island component in a lateral fiber cross section is 30 to 1000 nm.

By disposing the copolymerized polyester (B) as a dyeable polymer with cyclohexanedicarboxylic acid copolymerized in the form of islands in the polyolefin (A), it is possible to impart color developability to the polyolefin (A). Unlike when a dyeable polymer is disposed as a core of a core-sheath conjugate fiber or when it is disposed as islands of an islands-in-the-sea conjugate fiber, a dyeable polymer as an island component is exposed on a fiber surface in a polymer alloy fiber and, therefore, it is possible to obtain a fiber having increased color developability and a color developing efficiency due to the light transmitted to the island component being increased, and vivid and deep color development can be realized.

The polymer alloy fiber as referred to herein means a fiber in which an island component is dispersed discontinuously. That an island component is discontinuous means a state that the island component has a moderate length and a single yarn differs in shape of its islands-in-the-sea structure observed in cross sections of the yarn perpendicular to its fiber axis, that is, lateral fiber cross sections of the yarn, taken at arbitrary intervals in the same single yarn. The discontinuity of the island component can be confirmed by the method described in the Examples. When the island component is dispersed discontinuously, the island component is spindle-shaped and, therefore, the color developing efficiency due to the light transmitted to the island component is enhanced, brilliancy is improved, and deep color development is obtained. As described above, the polymer alloy fiber is essentially different from a core-sheath conjugate fiber in which one island is formed continuously and in the same shape along the fiber axis direction and an islands-in-the-sea conjugate fiber in which a plurality of islands are formed continuously and in the same shape along the fiber axis direction. Such a polymer alloy fiber can be obtained, for example, from a polymer alloy composition formed by kneading a polyolefin (A) and a copolymerized polyester (B) with cyclohexanedicarboxylic acid copolymerized at an arbitrary stage before melt spinning is completed.

The sea component constituting the islands-in-the-sea structure of the dyeable polyolefin fiber is a polyolefin (A). Since polyolefin is low in specific gravity, fibers superior in lightweight property can be obtained. Examples of the polyolefin (A) include, but are not limited to, polyethylene, polypropylene, polybutene-1, and polymethylpentene. Among these, polypropylene is preferable because it has good moldability and is superior in mechanical characteristics, and polymethylpentene is preferable because it has a high melting point and therefore is superior in heat resistance and it is lowest in specific gravity among polyolefins and therefore is superior in lightweight property. For clothing applications, polypropylene can be particularly suitably employed.

The polyolefin (A) may be either a homopolymer or a copolymer with a different α-olefin. As the different α-olefin (hereinafter sometimes referred to simply as α-olefin), one species or two or more species may be copolymerized.

The number of carbon atoms of the α-olefin is preferably 2 to 20, and the molecular chain of the α-olefin may be either linear or branched. Specific examples of the α-olefin include, but are not limited to, ethylene, propylene, 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, and 3-ethyl-1-hexene.

The copolymerization ratio of the α-olefin is preferably 20 mol % or less. A copolymerization ratio of the α-olefin is preferably 20 mol % or less because, in that case, it is possible to obtain a dyeable polyolefin fiber having good mechanical characteristics and high heat resistance. The copolymerization ratio of the α-olefin is more preferably 15 mol % or less, and even more preferably 10 mol % or less.

The island component constituting the islands-in-the-sea structure of the dyeable polyolefin fiber is a copolymerized polyester (B) with cyclohexanedicarboxylic acid copolymerized.

As a method of improving the color developability of a fiber, to reduce the crystallinity of a polymer to constitute the fiber and reduce the refractive index of the polymer can be enumerated, but it is more effective to reduce the refractive index of the polymer.

Since a dye is hardly exhausted to a crystal portion and easily exhausted to an amorphous portion, it is preferable that a polymer be as low in crystallinity as possible to improve color developability, and more preferably, the polymer is amorphous. For example, in the methods disclosed in Japanese Translation of PCT International Publication No. 2008-533315 and Japanese Translation of PCT International Publication No. 2001-522947, attempts have been made to impart color developability to polyolefin fibers by combining polyolefin with an amorphous copolymerized polyester with cyclohexanedimethanol copolymerized.

In addition, when the refractive index of a polymer constituting a fiber is lowered, reflected light from the fiber surface is reduced and light sufficiently penetrates into the inside of the fiber so that vivid and deep color developability can be imparted. To reduce the refractive index of the polymer, it is effective to reduce the aromatic ring concentration of the polymer. The aromatic ring concentration of a polymer is a value calculated by the following formula using the copolymerization ratio of copolymerization components having an aromatic ring (mol %) and the molecular weight of a repeating unit (g/mol).

Aromatic ring concentration (mol/kg)=Copolymerization ratio of copolymerization components having an aromatic ring (mol %)×10÷Molecular weight of repeating unit (g/mol).

In polyethylene terephthalate (PET), this is a copolymer of terephthalic acid and ethylene glycol, and terephthalic acid is a copolymerization component having an aromatic ring. In the method described in Japanese Translation of PCT International Publication No. 2008-533315 and Japanese Translation of PCT International Publication No. 2001-522947, a copolymerized polyester with cyclohexanedimethanol copolymerized to PET is proposed, and the copolymerization ratio of a copolymerization component having an aromatic ring is equal to that of PET and the molecular weight of the repeating units is higher than that of PET. As a result, the aromatic ring concentration calculated by the above formula is slightly lower than that of PET, and the refractive index is slightly lower than that of PET. We conducted intensive studies on the conventional problem of lacking brilliance and deepness and insufficient color developability in the methods disclosed in Japanese Translation of PCT International Publication No. 2008-533315 and Japanese Translation of PCT International Publication No. 2001-522947 and, as a result, discovered how to obtain a copolymerized polyester having a lower refractive index by copolymerizing cyclohexanedicarboxylic acid to PET. That is, by copolymerizing cyclohexanedicarboxylic acid to PET, the copolymerization ratio of the copolymerization component having an aromatic ring is made lower than that of PET and the molecular weight of the repeating unit is made higher than that of PET. As a result, the aromatic ring concentration calculated by the above formula is lower than that attained when copolymerizing cyclohexanedimethanol and the refractive index is also lower, and therefore color developability is higher and vivid and deep color development can be realized.

The dispersion diameter of the island component in a lateral fiber cross section of the dyeable polyolefin fiber is 30 to 1000 nm. The dispersion diameter of an island component in a lateral fiber cross section refers to a value measured by the method described in the Examples. The dispersion diameter of the island component in a lateral fiber cross section can be controlled to 30 to 1000 nm by adjusting the content ratio of the polyolefin (A) and the copolymerized polyester (B), adding a compatibilizer (C) described later, or the like. If the dispersion diameter of the island component in a lateral fiber cross section is 30 nm or more, dye is much taken into the copolymerized polyester (B) of the island component so that the color developing efficiency due to the light transmitted to the island component is improved and vivid and deep color development can be realized. On the other hand, if the dispersion diameter of the island component in a lateral fiber cross section is 1000 nm or less, it is possible to make a specific boundary area of the boundary between the sea and the islands sufficiently large so that it is possible to suppress boundary separation and abrasion caused thereby, the fiber has superior quality and will exhibit good rubbing fastness when being dyed. Further, the smaller the dispersion diameter of the island component is, the more the aggregation of the dye compound can be suppressed to bring it closer to monodisperse, the color developing efficiency is improved, and when the fiber is dyed, it exhibits better light fastness and better washing fastness. Therefore, the dispersion diameter of the island component in a lateral fiber cross section is preferably 700 nm or less, more preferably 500 nm or less, and particularly preferably 300 nm or less.

The copolymerized polyester (B) preferably includes cyclohexanedicarboxylic acid copolymerized in a content of 10 to 100 mol % based on all dicarboxylic acid components of the copolymerized polyester (B). The copolymerized polyester (B) is defined as a polycondensate composed of at least three components selected from among dicarboxylic acid components and diol components. However, when all the dicarboxylic acid components are composed only of cyclohexane dicarboxylic acid, that is, when a copolymer includes cyclohexanedicarboxylic acid in a content of 100 mol %, the copolymer is included in the copolymerized polyester (B) even if either one or two or more diol components are included. A higher copolymerization ratio of cyclohexanedicarboxylic acid is preferred because the higher the copolymerization ratio of cyclohexanedicarboxylic acid is, the lower the refractive index of the copolymerized polyester (B) is and the more the color developability of the dyeable polyolefin fiber is improved. The copolymerization ratio of cyclohexanedicarboxylic acid is preferably 10 mol % or more because in that case, the refractive index of the polymer is low, and vivid and deep color development can be realized. The copolymerization ratio of cyclohexanedicarboxylic acid is more preferably 15 mol % or more, and even more preferably 20 mol % or more. In addition, a copolymerization ratio of cyclohexanedicarboxylic acid of 30 mol % or more can be particularly preferably employed because in that case, the polymer is amorphous and therefore more dye is exhausted to the polymer so that higher color developability can be obtained.

The cyclohexanedicarboxylic acid may be any of 1,2-cyclohexanedicarboxylic acid, 1,3-cyclohexanedicarboxylic acid, and 1,4-cyclohexanedicarboxylic acid, and either only one species may be used or two or more species may be used in combination. Especially, 1,4-cyclohexanedicarboxylic acid can be suitably employed from the viewpoint of heat resistance and mechanical characteristics.

The copolymerized polyester (B) may be copolymerized with other copolymerization components, and specific examples thereof include, but are not limited to, aromatic dicarboxylic acids such as terephthalic acid, phthalic acid, isophthalic acid, 5-sodiumsulfoisophthalic acid, 1,5-naphthalenedicarboxylic acid, 2,6-naphthalenedicarboxylic acid, 2,2'-biphenyldicarboxylic acid, 3,3'-biphenyldicarboxylic acid, 4,4'-biphenyldicarboxylic acid, and anthracenedicarboxylic acid; aliphatic dicarboxylic acids such as malonic acid, fumaric acid, maleic acid, succinic acid, itaconic acid, adipic acid, azelaic acid, sebacic acid, 1,11-undecanedicarboxylic acid, 1,12-dodecanedicarboxylic acid, 1,14-tetradecanedicarboxylic acid, 1,18-octadecanedicarboxylic acid, 1,2-cyclohexanedicarboxylic acid, 1,3-cyclohexanedicarboxylic acid, and dimer acid; aromatic diols such as catechol, naphthalenediol, and bisphenol; and aliphatic diols such as ethylene glycol, trimethylene glycol, tetramethylene glycol, hexamethylene glycol, diethylene glycol, polyethylene glycol, polypropylene glycol, neopentyl glycol, and cyclohexanedimethanol. Either only one species of these copolymerization components may be used or two or more species thereof may be used in combination.

The dyeable polyolefin fiber preferably contains the copolymerized polyester (B) in an amount of 3.0 to 20.0 parts by weight per 100 parts by weight in total of the polyolefin (A), the copolymerized polyester (B), and the compatibilizer (C). The content of the copolymerized polyester (B) is preferably 3.0 parts by weight or more because in that case, the copolymerized polyester (B) having a low refractive index and high color developability is scattered in the polyolefin (A) being low in refractive index, and therefore vivid and deep color development can be realized. The content of the copolymerized polyester (B) is more preferably 3.5 parts by weight or more, and even more preferably 4.0 parts by weight or more. On the other hand, the content of the copolymerized polyester (B) is preferably 20.0 parts by weight or less because in that case, the color developing efficiency due to the light transmitted to the island component is improved by dyeing a large number of island components in the sea component and vivid and deep color development can be obtained. That example is preferable because it does not impair the lightweight property of the polyolefin (A). The content of the copolymerized polyester (B) is more preferably 17.0 parts by weight or less, and even more preferably 15.0 parts by weight or less.

A compatibilizer (C) may be added as required for the purposes of improving the dispersibility of the copolymerized polyester (B), which is an island component, in the polyolefin (A), which is a sea component, controlling the dispersion state of the copolymerized component (B), and improving the interfacial adhesion between the sea component and the island component. In addition, when an islands-in-the-sea structure is produced by melt spinning, bulges called Barns tend to be formed immediately below a spinneret to make the thinning deformation of the fiber unstable and accordingly, a compatibilizer (C) may be used with the aim of improving the spinning operability through, for example, prevention of thread breakage caused by the Barns or obtaining a high quality fiber that is small in variation of fineness and superior in uniformity in the longitudinal direction of a fiber.

The compatibilizer (C) may be selected appropriately according to the copolymerization ratio of the cyclohexanedicarboxylic acid in the copolymerized polyester (B), the content ratio of the polyolefin (A) as the sea component and the copolymerized polyester (B) as the island component. Either only one species of compatibilizer (C) may be used or two or more species thereof may be used in combination.

The compatibilizer (C) is preferably a compound in which a hydrophobic component having high affinity for the hydrophobic sea component polyolefin (A) and a functional group having a high affinity for the island component copolymerized polyester (B) are both contained in a single molecule. Alternatively, a compound in which a hydrophobic component having high affinity for the hydrophobic sea component polyolefin (A) and a functional group capable of reacting with the island component copolymerized polyester (B) are both contained in a single molecule can be suitably employed as the compatibilizer (C).

Specific examples of the hydrophobic component that constitutes the compatibilizer (C) include, but are not limited to, polyolefin-based resins such as polyethylene, polypropylene, and polymethylpentene; acrylic resins such as polymethyl methacrylate; styrene-based resins such as polystyrene; and conjugated diene-based resins such as ethylene-propylene copolymer, ethylene-butylene copolymer, propylene-butylene copolymer, styrene-butadiene-styrene copolymer, styrene-isoprene-styrene copolymer, styrene-ethylene-butylene-styrene copolymer, and styrene-ethylene-propylene-styrene copolymer.

Specific examples of the functional group having high affinity for the copolymerized polyester (B) or the functional group capable of reacting with the copolymerized polyester (B) that constitutes the compatibilizer (C) include, but are not limited to, an acid anhydride group, a carboxyl group, a hydroxyl group, an epoxy group, an amino group, and an imino group. Among them, the amino group and the imino group are preferred because of their high reactivity with the copolymerized polyester (B).

Specific examples of the compatibilizer (C) include, but are not limited to, maleic acid-modified polyethylene, maleic anhydride-modified polypropylene, maleic anhydride-modified polymethylpentene, epoxy-modified polypropylene, epoxy-modified polystyrene, maleic anhydride-modified styrene-ethylene-butylene-styrene copolymers, amine-modified styrene-ethylene-butylene-styrene copolymers, and imine-modified styrene-ethylene-butylene-styrene copolymers.

The compatibilizer (C) is preferably at least one compound selected from among polyolefin-based resins, acrylic resins, styrene-based resins, and conjugated diene-based resins each containing at least one functional group selected from among an acid anhydride group, a carboxyl group, a hydroxyl group, an epoxy group, an amino group, and an imino group. Among others, a styrene-ethylene-butylene-styrene copolymer containing at least one functional group selected from an amino group and an imino group is preferable because it is highly reactive with the copolymerized polyester (B) and it is highly effective to improve the dispersibility of the copolymerized polyester (B) in the polyolefin (A), and therefore the color developing efficiency due to the light transmitted to the island component is improved and vivid and deep color development can be obtained by dyeing the copolymerized polyester (B), which is an island component.

In adding a compatibilizer (C), the dyeable polyolefin fiber preferably contains the compatibilizer (C) in a content of 0.1 to 10.0 parts by weight per 100 parts by weight in total of the polyolefin (A), the copolymerized polyester (B), and the compatibilizer (C). A content of the compatibilizer (C) of 0.1 parts by weight or more is preferable because it leads to an effect to compatibilize the polyolefin (A) with the copolymerized polyester (B) so that the dispersion diameter of the island component is reduced and a dye compound is inhibited from aggregating and can reach close to monodispersity and, as a result, the color developing efficiency is improved and vivid and deep color development is obtained. In addition, it is preferable because the spinning operability such as prevention of thread breakage can be improved and a high-quality fiber being small in variation of fineness and superior in uniformity in the longitudinal direction of a fiber can be obtained. The content of the compatibilizer (C) is more preferably 0.3 parts by weight or more, and even more preferably 0.5 parts by weight or more. On the other hand, a content of the compatibilizer (C) of 10.0 parts by weight or less is preferable because the resulting fiber can maintain good fiber characteristics, appearance, and texture that originate from the polyolefin (A) and the copolymerized polyester (B) constituting the dyeable polyolefin fiber. In addition, it is preferable because this prevents the spinning operability from being destabilized by an excessive compatibilizer. The content of the compatibilizer (C) is more preferably 7.0 parts by weight or less, and even more preferably 5.0 parts by weight or less.

The dyeable polyolefin fiber preferably contains an antioxidant. Polyolefin easily undergoes oxidative decomposition due to light and heat. Therefore, inclusion of an antioxidant is preferable because the oxidative decomposition of polyolefin by long-term storage or tumbler drying is thereby suppressed and durability of fiber characteristics including mechanical characteristics is improved. On the other hand, depending on the type, combination, and content of antioxidants, yellowing of a fiber during long-term storage caused by a nitrogen oxide gas or a phenolic compound is induced. Therefore, it is preferable to choose the type, combination, and content of antioxidants that are capable of simultaneously attaining both suppression of oxidative decomposition of polyolefin and suppression of yellowing of a fiber. Phenolic yellowing refers to yellowing of fibers caused by BHT (3,5-di-t-butyl-4-hydroxytoluene) (hereinafter sometimes simply referred to as "BHT"), which is a phenolic compound contained as an antioxidant in a packaging material such as a plastic bag. Since conventional polyolefin fibers are difficult to dye with a dye, they are subjected to dyeing with a pigment. Since color obtained by dyeing with a pigment is generally dark, yellowing of a fiber itself has little influence on the color tone after dyeing. In contrast, our dyeable polyolefin fiber can be dyed with a dye. Since colors obtained by dyeing with dyes widely range from light color to dark color and, especially in light color, yellowing of a fiber itself has a large influence on the color tone after dyeing, it is preferable that yellowing of the fiber caused by an antioxidant be suppressed.

The antioxidant is preferably a phenol-based compound, a phosphorus-based compound, or a hindered amine-based compound. Such antioxidants may be used singly or two or more species thereof may be used in combination.

The phenol-based compound is a radical chain reaction inhibitor having a phenol structure, and either only one species thereof or a combination of two or more species thereof may be used. Among them, pentaerythritol tetrakis (3-(3,5-di-t-butyl-4-hydroxyphenol)propionate) (e.g., Irganox 1010 produced by BASF), 2,4,6-tris(3',5'-di-t-butyl-4'-hydroxybenzyl)mesitylene (e.g., ADK STAB AO-330 produced by ADEKA), 3,9-bis[1,1-dimethyl-2-[β-(3-t-butyl-4-hydroxy-5-methylphenyl)propionyloxy]ethyl]-2,4,8,10-tet raoxaspiro[5,5]-undecane (e.g., Sumilizer GA-80 produced by Sumitomo Chemical Co., Ltd., ADK STAB AO-80 produced by ADEKA), and 1,3,5-tris[[4-(1,1-dimethylethyl)-3-hydroxy-2,6-dimethylphenyl]methyl]-1,3,5-triazine-2,4,6(1H, 3H,5H)-trione (e.g., THANOX 1790 produced by Tokyo Chemical Industry Co., Ltd., CYANOX 1790 produced by CYTEC) can be suitably employed because of their high oxidative decomposition inhibiting effect. Especially, 3,9-bis[1,1-dimethyl-2-[β-(3-t-butyl-4-hydroxy-5-methylphenyl)propionyloxy]ethyl]-2,4,8,10-tet raoxaspiro[5,5]-undecane (e.g., Sumilizer GA-80 produced by Sumitomo Chemical Co., Ltd., ADK STAB AO-80 produced by ADEKA), and 1,3,5-tris[[4-(1,1-dimethylethyl)-3-hydroxy-2,6-dimethylphenyl]methyl]-1,3,5-triazine-2,4,6(1H, 3H,5H)-trione (e.g., THANOX 1790 produced by Tokyo Chemical Industry Co., Ltd., CYANOX 1790 produced by CYTEC) can be particularly suitably employed because when being exposed to a nitrogen oxide gas, the phenol-based compounds themselves hardly change to quinone-based compounds, which are substances to cause yellowing so that yellowing of a fiber caused by a nitrogen oxide gas during long storage can be suppressed.

The phosphorus-based compound is a phosphorus-based antioxidant that reduces a peroxide without generating radicals and is oxidized itself, and either one species thereof or a combination of two or more species thereof may be used. Among these, tris(2,4-di-t-butylphenyl) phosphite (e.g., Irgafos 168 produced by BASF) and 3,9-bis(2,6-di-t-butyl-4-methylphenoxy)-2,4,8,10-tetraoxa-3,9-diphosphaspiro[5,5]undecane (e.g., ADK STAB PEP-36 produced by ADEKA) can be suitably employed because of their high oxidative decomposition inhibiting effect.

The hindered amine-based compound is a hindered amine-based antioxidant having the effect of capturing radicals generated by ultraviolet rays or heat and the effect of regenerating a phenol-based antioxidant that has been deactivated by functioning as an antioxidant. The hindered amine-based compound may be used singly or two or more thereof may be used in combination. Among them, an aminoether type hindered amine-based compound or a high molecular weight type hindered amine-based compound having a molecular weight of 1000 or more can be suitably employed. Of the hindered amine-based compounds, an aminoether type hindered amine-based compound has low basicity. We studied yellowing of fibers caused by a nitrogen oxide gas or a phenolic compounds and, as a result, found that the lower the basicity of a hindered amine-based compound, the better the phenol-based compound as an antioxidant or the phenolic compound contained in a packaging material is prevented from changing to a quinone-based compound, which is a substance to cause yellowing. That is, an aminoether type hindered amine-based compound is preferable because it can suppress yellowing of fibers caused by a nitrogen oxide gas or a phenolic compound during long-term storage. Specific examples of the aminoether type hindered amine-based compound include, but are not limited to, bis(1-undecanoxy-2,2,6,6-tetramethylpiperidin-4-yl) carbonate (e.g., ADK STAB LA-81 produced by ADEKA) and bis-(1-octyloxy-2,2,6,6-tetramethyl-4-piperidinyl) sebacate (e.g., Tinuvin PA123 produced by BASF). Besides the aminoether type hindered amine-based compound, specific examples of the hindered amine-based compounds having low basicity include, but are not limited to, an ester of 4-hydroxy-2,2,6,6-tetramethyl-1-piperidineethanol and 3,5, 5-trimethylhexanoic acid (e.g., Tinuvin 249 produced by BASF). A high molecular weight hindered amine-based compound having a molecular weight of 1,000 or more is preferable because it can suppress elution thereof from the inside of the fiber by washing or cleaning using an organic solvent, resulting in superior durability of an oxidative decomposition inhibiting effect. Specific examples of the high molecular weight type hindered amine-based compound having a molecular weight of 1000 or more include, but are not limited to, N—N'—N"—N"'-tetrakis(4,6-bis (butyl-(N-methyl-2,2,6,6-tetramethylpiperidin-4-yl)amino) triazin-2-yl)-4,7-diazadecane-1,10-diamine (e.g., SABOSTAB UV 119 produced by SABO), poly((6-(1,1,3,3-tetramethylbutyl)amino)-1,3,5-triazine-2,4-diyl)(2,2,6,6-tetramethyl-4-piperidin yl)imino)-1,6-hexanediyl(2,2,6,6-tetramethyl-4-piperidinyl)imino)) (e.g., CHIMASSORB 944 produced by BASF), and a polycondensate of dibutylamine-1,3,5-triazine-N,N'-bis(2,2,6,6-tetramethyl-4-piperidyl)-1,6-hexamethylenediamine and N-(2,2,6,6-tetramethyl-4-piperidyl)butylamine (e.g., CHIMASSORB 2020 produced by BASF).

The content of the antioxidant in the dyeable polyolefin fiber is preferably 0.1 to 5.0 parts by weight per 100 parts by weight in total of the polyolefin (A), the copolymerized polyester (B), and the compatibilizer (C). A content of the antioxidant of 0.1 parts by weight or more is preferable because an oxidative decomposition inhibiting effect can be imparted to a fiber. The content of the antioxidant is more preferably 0.3 parts by weight or more, and even more preferably 0.5 parts by weight or more. On the other hand, a content of the antioxidant of 5.0 parts by weight or less is preferable because the color tone of the fiber is not deteriorated and the mechanical characteristics are not impaired. The content of the antioxidant is more preferably 4.0 parts by weight or less, even more preferably 3.0 parts by weight or less, and particularly preferably 2.0 parts by weight or less.

The dyeable polyolefin fiber may be one that has been modified through various methods by adding minor additives. Specific examples of such minor additives include, but are not limited to, a plasticizer, an ultraviolet absorber, an infrared ray absorbent, a fluorescent brightening agent, a mold releasing agent, an antibacterial agent, a nuclear formation agent, a thermal stabilizer, an antistatic agent, a color protection agent, an adjustor, a delustering agent, an antifoaming agent, an antiseptic agent, a gelatinizer, latex, a filler, ink, a coloring agent, a dye, pigments, and perfume. These minor additives may be used singly, or a plurality thereof may be used in combination.

Next, the dyeable polyolefin fiber is described.

The fineness of the dyeable polyolefin fiber as a multifilament is not particularly limited and may be appropriately chosen according to particular uses and required characteristics, but it is preferably 10 to 3000 dtex. The fineness refers to a value measured by the method described in the examples. It is preferable that the fineness of the dyeable polyolefin fiber be 10 dtex or more because such a fineness ensures low thread breakage frequency and high process-passing capability and such a fiber will not suffer significant fuzzing during use, leading to superior durability. The fineness of the dyeable polyolefin fiber is more preferably 30 dtex or more, and even more preferably 50 dtex or more. On the other hand, a fineness of the dyeable polyolefin fiber of 3000 dtex or less is preferable because the flexibility of the fiber and a fibrous structure thereof will not be impaired. The fineness of the dyeable polyolefin fiber is more preferably 2,500 dtex or less, and even more preferably 2,000 dtex or less.

The single yarn fineness of the dyeable polyolefin fiber is not particularly limited and may be appropriately chosen according to particular uses and required characteristics, but it is preferably 0.5 to 20 dtex. The single fiber fineness means a value determined by dividing a fineness measured by the method described in the Examples by a single yarn number. It is preferable that the single yarn fineness of the dyeable polyolefin fiber be 0.5 dtex or more because such a fineness ensures low thread breakage frequency and high process-passing capability and such a fiber will not suffer significant fuzzing during use, leading to superior durability. The single yarn fineness of the dyeable polyolefin fiber is more preferably 0.6 dtex or more, and even more preferably 0.8 dtex or more. On the other hand, a single fiber fineness of the dyeable polyolefin fiber of 20 dtex or less is preferable because the flexibility of the fiber and a fibrous structure thereof will not be impaired. The single yarn fineness of the dyeable polyolefin fiber is more preferably 15 dtex or less, and even more preferably 12 dtex or less.

The strength of the dyeable polyolefin fiber is not particularly limited and may be appropriately chosen according to particular uses and required characteristics, but it is preferably 1.0 to 6.0 cN/dtex from the viewpoint of mechanical characteristics. The strength as used herein means a value measured by the method described in the Examples. It is preferable that the strength of the dyeable polyolefin fiber be 1.0 cN/dtex or more because the fiber will not suffer significant fuzzing during use, leading to superior durability. The strength of the dyeable polyolefin fiber is more preferably 1.5 cN/dtex or more, and even more preferably 2.0 cN/dtex or more. On the other hand, it is preferable that the strength of the dyeable polyolefin fiber be 6.0 cN/dtex or less because the flexibility of the fiber and the fibrous structure will not be impaired.

The elongation percentage of the dyeable polyolefin fiber is not particularly limited and may be appropriately chosen according to particular uses and required characteristics, but it is preferably 10 to 60% from the viewpoint of durability. The elongation percentage as used herein refers to a value measured by the method described in the Examples. It is preferable that the elongation percentage of the dyeable polyolefin fiber be 10% or more because if so, the fiber and a fibrous structure thereof will have good wear resistance and will not suffer significant fuzzing during use, leading to high durability. The elongation percentage of the dyeable polyolefin fiber is more preferably 15% or more, and even more preferably 20% or more. On the other hand, the elongation percentage of the dyeable polyolefin fiber of 60% or less is preferable because such an elongation percentage leads to good dimensional stability of the fiber and the fibrous structure. The elongation percentage of the dyeable polyolefin fiber is more preferably 55% or less, and even more preferably 50% or less.

The fineness variation value U % (hi) of the dyeable polyolefin fiber is preferably 0.1 to 1.5%. The fineness variation value U % (hi) as used herein means a value measured by the method described in the Examples. The fineness variation value U % is an indicator of thickness irregularity in the longitudinal direction of a fiber, and the smaller the fineness variation value U % (hi), the smaller the thickness irregularity in the longitudinal direction of the fiber. From the viewpoints of process-passing capability and quality, it is preferable that the fineness variation value U % (hi) be as small as possible, but the lower limit of its range available in practical production is 0.1%. On the other hand, a fineness variation value U % (hi) of the dyeable polyolefin fiber of 1.5% or less is preferable because in such a case, the uniformity in the longitudinal direction of the fiber is superior, and fuzz and thread breakage are unlikely to occur, and when being dyed, defects such as dyeing specks or dyeing streaks are unlikely to occur and a high quality fibrous structure can be obtained. The fineness variation value U % (hi) of the dyeable polyolefin fiber is more preferably 1.2% or less, even more preferably 1.0% or less, and particularly preferably 0.9% or less.

The specific gravity of the dyeable polyolefin fiber is preferably 0.83 to 1.0. The specific gravity refers to a value measured by the method described in the Examples and is a true specific gravity. When the fiber has a hollow portion, its apparent specific gravity is small even though its true specific gravity is the same and, therefore, the value of the apparent specific gravity varies according to the hollow ratio. Polyolefin is low in specific gravity, for example, the specific gravity of polymethylpentene is 0.83 and the specific gravity of polypropylene is 0.91. When a polyolefin is fiberized alone, fibers having superior lightweight property can be obtained, but there is a disadvantage that they cannot be dyed. Color developability can be imparted to a polyolefin fiber inherently superior in lightweight property by forming a polymer alloy fiber including a low specific gravity polyolefin and a dyeable copolymerized polyester. The specific gravity of the dyeable polyolefin fiber varies depending on the specific gravity of the copolymerized polyester (B) to be combined with the polyolefin (A) and the content ratio of the polyolefin (A) and the copolymerized polyester (B). The specific gravity of the dyeable polyolefin fiber should be as low as possible from the viewpoint of lightweight property, and it is preferably 1.0 or less. A specific gravity of the dyeable polyolefin fiber of 1.0 or less is preferable because the lightweight property of the polyolefin (A) and the color developability of the copolymerized polyester (B) can be maintained simultaneously. The specific weight of the dyeable polyolefin fiber is more preferably 0.97 or less, and even more preferably 0.95 or less.

The dyeable polyolefin fiber preferably satisfies the condition that the maximum temperature of a sample thereof is 155° C. or less during isothermal holding of the sample at 150° C. for 100 hours in a test in accordance with the oxidative exotherm test method (acceleration method) of polypropylene fibers specified by Japan Chemical Fibers Association. If the maximum temperature of the dyeable polyolefin fiber to be used as a sample in an oxidative exotherm test is 155° C. or less, this is preferable because oxidative decomposition of the polyolefin during tumbler drying and long-term storage is suppressed and the fiber is superior in fiber characteristics such as mechanical characteristics as well as in durability of texture and quality. The maximum temperature of the dyeable polyolefin fiber to be used as a sample in an oxidative exotherm test is more preferably 153° C. or less, and even more preferably 151° C. or less.

The dyeable polyolefin fiber preferably satisfies the condition that the color fastness to nitrogen oxides measured according to JIS L0855:2005 (hereinafter sometimes simply referred to as "fastness to nitrogen oxides") is class 4 or more. If the color fastness of the dyeable polyolefin fiber to nitrogen oxides is class 4 or more, this is preferable because yellowing of the fiber caused by a nitrogen oxide gas during long-term storage is suppressed and the fiber and a fibrous structure thereof are good in quality in any state of before dyeing and after dyeing. In addition, it is preferable because dyeing specks in consequence of the yellowing of the fiber and the fibrous structure hardly occur. The color fastness of the dyeable polyolefin fiber to nitrogen oxides is more preferably class 4-5 or more, and even more preferably is class 5.

The dyeable polyolefin fiber preferably satisfies the condition that the phenolic yellowing as measured in accordance with ISO 105-X18:2007 is class 3 or more. As described above, the phenolic yellowing is the yellowing of the fiber due to the BHT of the phenolic compound contained as an antioxidant in a packaging agent such as a plastic bag. If the phenolic yellowing of the dyeable polyolefin fiber is class 3 or more, this is preferable because yellowing of the fiber caused by the phenolic compound in a packaging material during long-term storage is suppressed and the fiber and a fibrous structure thereof are good in quality in any state of before dyeing and after dyeing. In addition, it is preferable because dyeing specks in consequence of the yellowing of the fiber and the fibrous structure hardly occur. The phenolic yellowing of the dyeable polyolefin fiber is more preferably class 3-4 or more, even more preferably class 4 or more, and particularly preferably class 4-5 or more.

For the dyeable polyolefin fiber, there are no specific limitations on the shape of the fiber cross section and the shape can be appropriately chosen depending on particular uses and required characteristics. The shape of the cross section may be either perfect circular or non-circular. Specific examples of such non-circular shapes include, but are not limited to, multilobar, polygonal, flattened, elliptic, C-shaped, H-shaped, S-shaped, T-shaped, W-shaped, X-shaped, Y-shaped, grid-like, double-crossed, and hollow.

There are no specific limitations on the form of the dyeable polyolefin fiber, which therefore, may be in the form of monofilament, multifilament, or staple.

As in other general fibers, the dyeable polyolefin fiber may be processed by, for example, false-twisting and twining, and may also be woven and knitted by methods generally used for fiber.

There are no specific limitations on the form of the fibrous structures to be produced from the dyeable polyolefin fiber which, therefore, may be processed by generally known methods into, for example, woven fabric, knitted fabric, pile fabric, nonwoven fabric, spun yarn, and wadding. Fibrous structures to be produced from the dyeable polyolefin fiber may be of any weave or knit structure and may preferably be processed by plain weaving, diagonal weaving, sateen weaving, or their modified weaving techniques, or warp knitting, weft knitting, circular knitting, lace stitching, or their modified knitting techniques.

The dyeable polyolefin fiber may be produced by combining it with other fibers by mixed weaving or mixed knitting to form fibrous structures or preparing combined filament yarns along with other fibers, followed by processing them into fibrous structures.

Described below is the method of the production of the dyeable polyolefin fiber.

As a method of producing the dyeable polyolefin fiber, a known melt spinning method and a known drawing method can be adopted.

It is preferable that the polyolefin (A), the copolymerized polyester (B), and the compatibilizer (C) have been dried to a water content of 0.3% by weight or less. A water content of 0.3% by weight or less is preferable because foam formation is prevented from being caused by water during the melt spinning, allowing the spinning to be performed stably. In addition, it is preferable because reduction of mechanical characteristics and deterioration of color tone due to hydrolytic degradation are suppressed. The water content is more preferably 0.2% by weight or less and still more preferably 0.1% by weight or less.

When polymer alloy type spinning is to be performed, useful methods of discharging a melt through a spinneret to provide a fiber thread include, but are not limited to, those described below. In a first example, the sea component and the island component are melt-kneaded in an extruder or the like to prepare a composite material and chips thereof are dried as required, followed by supplying the chips to a melt spinning machine, where they are melted, and weighing the melt by a metering pump. Subsequently, it is introduced into the spinning pack heated in the spin-block and the molten polymer is filtered in the spinning pack, followed by discharging it through the spinneret to provide a fiber thread. In a second example, chips are dried as required and the chips of the sea component and those of the island component are mixed together, followed by supplying the mixed chips to a melt spinning machine, where they are melted, and weighing by a metering pump. Subsequently, it is introduced into the spinning pack heated in the spin-block and the molten polymer is filtered in the spinning pack, followed by discharging it through the spinneret to provide a fiber thread.

The fiber thread discharged from the spinneret is cooled and solidified in a cooling apparatus, taken up by a first godet roller, and wound up by a winder via a second godet roller to provide a wound yarn. A heating cylinder or heat insulation cylinder with a length of 2 to 20 cm may be installed below the spinneret as required to improve the spinning operability, productivity, and mechanical characteristics of the fiber. In addition, an oil feeder may be used to supply oil to the fiber thread or an entangling machine may be used to entangle the fiber thread.

The spinning temperature in melt spinning may be appropriately chosen depending on the melting points and the heat resistance of the polyolefin (A), the copolymerized polyester (B), and the compatibilizer (C), but it is preferably 220 to 320° C. A spinning temperature of 220° C. or more is preferable because the elongation viscosity of the fiber thread discharged through the spinneret is maintained sufficiently low to ensure stable discharge and also because the spinning tension is prevented from increasing excessively to suppress thread breakage. The spinning temperature is more preferably 230° C. or more, and even more preferably 240° C. or more. On the other hand, a spinning temperature of 320° C. or less is preferable because heat decomposition during spinning is suppressed and the resulting dyeable polyolefin fiber does not suffer deterioration in mechanical characteristics or coloring. The spinning temperature is more preferably 300° C. or less, and even more preferably 280° C. or less.

The spinning speed in melt spinning may be chosen appropriately depending on the content ratio of the polyolefin (A) and the copolymerized polyester (B), the spinning temperature and the like, but it is preferably 500 to 6000 m/min. A spinning speed of 500 m/min or more is preferable because the traveling thread is maintained stable and thread breakage can be suppressed. The spinning speed in the two-step process is more preferably 1000 m/min or more, and even more preferably 1500 m/min or more. On the other hand, a spinning speed of 6000 m/min or less is preferable because thread breakage is prevented due to suppression of spinning tension and stable spinning can be carried out. The spinning speed in the two-step process is more preferably 4500 m/min or less, and even more preferably 4000 m/min or less. Further, the spinning speed in the one-step process in which spinning and drawing are simultaneously carried out without winding up is preferably adjusted to 500 to 5000 m/min for a lower speed roller and 2500 to 6000 m/min for a higher speed roller. Spinning speeds of the lower speed roller and the higher speed roller within the above ranges are preferable because the traveling thread is maintained stable and thread breakage can be suppressed and therefore stable spinning can be carried out. The spinning speed in the one-step process is more preferably adjusted to 1000 to 4500 m/min for the lower speed roller and 3500 to 5500 m/min for the higher speed roller, and even more preferably 1500 to 4000 m/min for the lower speed roller and 4000 to 5000 m/min for the higher speed roller.

When such drawing is carried out by a one-step process or a two-step process, it may be performed by either a single stage drawing process or a multi-stage drawing process in which the fiber is drawn in two or more stages. There are no specific limitations on the heating methods to be used for the drawing as long as the traveling thread can be heated directly or indirectly. Specific examples of heating methods include, but are not limited to, a heating roller, a heating pin, a heating plate, liquid bath such as warm water and hot water, gas bath such as hot air and steam, and laser. Such heating methods may be used singly, or two or more thereof may be used in combination. Favorable heating methods include contact with a heating roller, contact with a heating pin, contact with a heating plate, and immersion in a liquid bath from the viewpoint of control of the heating temperature, uniform heating of the traveling thread, and simplification of equipment.

The drawing temperature in carrying out drawing can be appropriately chosen according to the melting points of the polyolefin (A), the copolymerized polyester (B), and the compatibilizer (C) and the strength and the elongation percentage of a fiber after drawing, and it is preferably 50 to 150° C. A drawing temperature of 50° C. or more is preferable because the thread fed to the drawing step is preheated sufficiently and uniform heat deformation is achieved during drawing to ensure the suppression of uneven fineness distribution and a high-quality fiber superior in uniformity in the longitudinal direction of the fiber can be obtained. The drawing temperature is more preferably 60° C. or more, and even more preferably 70° C. or more. On the other hand, a drawing temperature of 150° C. or less is preferable because in such a case, it is possible to suppress welding and thermal decomposition of fibers due to their contact with a heating roller, leading to good process-passing capability and high quality. In addition, it is preferable because the fiber can slip smoothly on the drawing rollers to ensure suppression of thread breakage and stable drawing. The drawing temperature is more preferably 145° C. or less and even more preferably 140° C. or less. In addition, heat setting may be performed at 60 to 150° C. as required.

The draw ratio in performing drawing may be appropriately chosen depending on the elongation percentage of a fiber before drawing, the strength and elongation percentage of a fiber after drawing, but it is preferably 1.02 to 7.0. A draw ratio of 1.02 or more is preferable because such drawing can improve mechanical characteristics such as strength and elongation percentage of a fiber. The draw ratio is more preferably 1.2 or more, and even more preferably 1.5 or more. On the other hand, a draw ratio of 7.0 or less is preferable because thread breakage during drawing is suppressed to ensure stable drawing. The draw ratio is more preferably 6.0 or less, and even more preferably 5.0 or less.

If drawing is to be performed, the drawing speed may be chosen appropriately depending on, for example, whether the drawing method is a one-step process or a two-step process. In the one-step process, the speed of the higher speed roller of the above-mentioned spinning speed corresponds to the drawing speed. The drawing speed in drawing by the two-step process is preferably 30 to 1000 m/min. A drawing speed of 30 m/min or more is preferable because stability of the traveling thread is maintained and thread breakage can be suppressed. The drawing speed in drawing by the two-step process is more preferably 50 m/min or more and even more preferably 100 m/min or more. On the other hand, a drawing speed of 1000 m/min or less is preferable because thread breakage during drawing is suppressed to ensure stable drawing. The drawing speed in drawing by the two-step process is more preferably 900 m/min or less and even more preferably 800 m/min or less.

The dyeable polyolefin fiber may be dyed in a state of either a fiber or a fibrous structure as required. For the dyeable polyolefin fiber, a disperse dye can be suitably employed as a dye. The polyolefin (A), which is the sea component that constitutes the dyeable polyolefin fiber, is hardly dyed, but a fiber or fibrous structure with vivid and deep color developability can be obtained by dyeing the copolymerized polyester (B) with cyclohexanedicarboxylic acid copolymerized, which is the island component.

There are no specific limitations on the method of dyeing the dyeable polyolefin fiber, and generally known methods may be performed favorably using a cheese dyeing machine, a jet dyeing machine, a drum dyeing machine, a beam dyeing machine, a jigger dyeing machine, a high pressure jigger dyeing machine or the like.

There are no specific limitations on the dye concentration and dyeing temperature, and generally known methods can be adopted favorably. In addition, scouring may be performed as required before the dyeing step and reduction cleaning may be performed after the dyeing step.

The dyeable polyolefin fiber and a fibrous structure composed thereof can impart vivid and deep color developability to polyolefin fibers inherently superior in lightweight property. Accordingly, they can be applied to apparel and other applications that require lightweight property and color developability, in addition to the applications where conventional polyolefin-based fibers have been used. The applications where conventional polyolefin-based fibers have been adopted include, but are not limited to, interior uses such as tile carpets, household carpets, automobile mats, bedding such as mattress wadding and pillow wadding, and general material uses such as ropes, protective nets, filter fabrics, narrow tapes, braids, and chair upholstery. In addition, there will be new applications to be developed, including, but not limited to, general clothing such as women's wear, men's wear, lining, underwear, down jackets, vests, inner garments, and outer garments; sports clothing such as wind breakers, outdoor sports wear, skiing wear, golf wear, and swimsuits; bedding such as outer fabrics of mattress, mattress covers, blankets, outer fabrics of blankets, blanket covers, pillow covers, and sheets; interior materials such as tablecloth and curtains; and other materials such as belts, bags, sewing threads, sleeping bags, and tents.

EXAMPLES

Our fibers and fibrous structures are described in more detail below with reference to Examples. The characteristic values given in Examples were determined by the following methods.

A. Melting Peak Temperature

Using a polymer of a sea component (A) or an island component (B) as a sample, a melting peak temperature was measured by using a differential scanning calorimeter (DSC) model Q2000 manufactured by TA Instruments. First, a sample of about 5 mg was heated from 0° C. to 280° C. in a nitrogen atmosphere at a heating rate of 50° C./min and maintained at 280° C. for 5 minutes to remove heat history from the sample. Then, it was rapidly cooled from 280° C. to 0° C., and then heated again from 0° C. to 280° C. at a heating rate of 3° C./min, a temperature modulation amplitude of ±1° C., and a temperature modulation period of 60 seconds and TMDSC measurement was carried out. According to 9.1 of JIS K 7121: 1987 (Testing Methods for Transition Temperatures of Plastics), the melting peak temperature was calculated from the melting peak observed during the second heating process. The measurement was performed three times per one sample, and the average value of the measurements was taken as the melting peak temperature. When a plurality of melting peaks were observed, the melting peak temperature was calculated from the melting peak on the lowest temperature side.

B. Aromatic Ring Concentration

For a polymer of a sea component (A) or an island component (B), an aromatic ring concentration (mol/kg) was calculated from the following formula using the copolymerization ratio (mol %) of a copolymerization component having an aromatic ring and the molecular weight (g/mol) of a repeating unit.

Aromatic ring concentration (mol/kg)=Copolymerization ratio of copolymerization components having an aromatic ring (mol %)×10÷Molecular weight of repeating unit (g/mol).

C. Refractive Index

A press film was prepared using 1 g of a polymer of a sea component (A) or an island component (B) vacuum-dried beforehand as a sample and using a 15 TON four-pillar single action ascent type press manufactured by Gonno Hydraulic Manufacturing Co., Ltd. A sample and a spacer having a thickness of 50 μm were inserted into the press with the sample and the spacer sandwiched between infusible polyimide films ("KAPTON" (registered trademark) 200 H produced by DuPont-Toray Co., Ltd.), melted at 230° C. for 2 minutes, then pressed under a pressure of 2 MPa for 1 minute, then rapidly removed from the press, and rapidly cooled in water at 20° C., and thus a press film having a thickness of 50 μm was obtained. Subsequently, the refractive index of the press film was measured in accordance with the method of measuring a film sample described in 6 of JIS K0062:1992 (Test Methods for Refractive Index of Chemical Products). Using an Abbe refractometer Model ER-1 manufactured by Elma, monobromonaphthalene (nD=1.66) as an intermediate solution, and a test piece (nD=1.74) as a glass piece under an environment with a temperature of 20° C. and a humidity of 65% RH, measurement was performed three times per one sample, and the average value of the measurements was taken as the refractive index.

Press films were prepared while changing the melting temperature to 270° C. for the polymer of the island component (B) of Comparative Example 1, and to 250° C. for the polymers of the sea component (A) of Examples 25 to 29 and the polymers of the island components (B) of Examples 1, 2, 25 and Comparative Example 4.

D. Content Ratio

The content ratio of sea component (A)/island component (B)/compatibilizer (C) [parts by weight] was calculated on the basis of 100 parts by weight in total of the sea component (A), the island component (B), and the compatibilizer (C) used as raw materials of a dyeable polyolefin fiber.

E. Fineness

Under an environment with a temperature of 20° C. and a humidity of 65% RH, a 100 m fiber obtained in Examples was wound into a hank using an electric sizing reel manufactured by INTEC. The weight of the resulting hank was measured and its fineness (dtex) was calculated using the following equation. The measurement was carried out five times per one sample, and the average value of the measurements was taken as a fineness.

Fineness (dtex)=weight (g) of fiber (100 m)×100.

F. Strength and Elongation Percentage

The strength and the elongation percentage were calculated according to 8.5.1 of JIS L1013:2010 (Test Methods for Chemical Fiber Filament Yarn) using a fiber obtained in Examples as a sample. Under an environment with a temperature of 20° C. and a humidity of 65% RH, a tensile test was performed using a TENSILON UTM-III-100 (manufactured by ORIENTEC Corporation) under the conditions of an initial sample length of 20 cm and a tension speed of 20 cm/min. The strength (cN/dtex) was calculated by dividing the stress (cN) at the point showing the maximum load by the fineness (dtex) and the elongation percentage (%) was calculated by the following equation from the elongation (L1) at the point showing the maximum load and the initial sample length (L0). The measurement was carried out ten times per one sample, and the average value of the measurements was taken as strength and elongation percentage.

Elongation percentage (%)={(L1−L0)/L1}×100.

G. Fineness Variation Value U % (Hi)

Regarding the fineness variation value U % (hi), U % (half inert) was measured using fibers obtained in Examples as a sample under the condition specified by a measuring speed of 200 m/min, a measuring time of 2.5 minutes, a length of measured fibers of 500 m, and the number of twist (S twist) of 12000/m by using an Uster Tester 4-CX manufactured by Zellweger Uster. The measurement was carried out five times per one sample, and the average value of the measurements was taken as the fineness variation value U % (hi).

H. Dispersion Diameter of Island Component, Discontinuity of Island Component

After embedding a fiber obtained in Examples with an epoxy resin, the fiber was cut together with the epoxy resin with an Ultramicrotome LKB-2088 manufactured by LKB in the direction perpendicular to the fiber axis, and thus an ultrathin section having a thickness of about 100 nm was obtained. The ultrathin section obtained was stained by holding it in a vapor phase generated from solid ruthenium tetroxide for about 4 hours at ambient temperature and then the stained face was cut with the Ultramicrotome, and thus an ultrathin section stained with ruthenium tetroxide was prepared. For the stained ultrathin section, its cross section perpendicular to the fiber axis, that is, its lateral fiber cross section was observed under the condition with an acceleration voltage of 100 kV and a microscopic photograph of the lateral fiber cross section was taken using a transmission electron microscope (TEM) H-7100FA manufactured by Hitachi Ltd. The observation was carried out at magnifications of 300, 500, 1000, 3000, 5000, 10000, 30000, and 50000, and when taking a microscopic photograph, the lowest magnification with which 100 or more island components were able to be observed was chosen. For the photographs taken, the diameters of 100 island components randomly extracted in the same photograph were measured with image processing software (WINROOF produced by Mitani Corporation), and the average value of the measurements was taken as the dispersion diameter (nm) of the island component. Since an island component existing in the lateral fiber cross section is not necessarily a perfect circle in shape, the diameter of a circumscribed circle was adopted as the dispersion diameter of the island component when it is not a perfect circle.

When the number of island components existing in a lateral fiber cross section of a single yarn is less than 100, the lateral fiber cross section was observed using a plurality of single yarns produced under the same conditions as samples. When taking a microscopic photograph, the highest magnification with which the entire image of the single yarn was able to be observed was chosen. For the photograph taken, the dispersion diameter of an island component existing in the lateral fiber cross section of each single yarn was measured, and the average value of the dispersion diameters of 100 island components in total was taken as the dispersion diameter of the island component.

Regarding the discontinuity of the island component, five microscopic photographs of the lateral fiber cross section were taken at arbitrary intervals of at least 10,000 times the single yarn diameter in the same single yarn, and when the respective lateral fiber cross sections are different in the number of island components and the shape of the islands-in-the-sea structure, it was assumed that the island component was discontinuous, and when the island component was discontinuous, this was denoted by "Y" and when the island component was not discontinuous, this was denoted by "N".

I. Specific Gravity

The specific gravity of a fiber was calculated according to 8.17 (Sink-float method) of JIS L1013:2010 (Test Methods for Chemical Fiber Filament Yarn) using the fibers obtained in Examples. A specific gravity measuring liquid was prepared using water as heavy liquid and ethyl alcohol as light liquid. In a temperature-controlled bath of a temperature of 20±0.1° C., a fiber sample of about 0.1 g was left in the specific gravity measuring liquid for 30 minutes and then the sink-and-float state of the sample was observed. Either the heavy liquid or the light liquid was added depending on the sink-and-float state and the specimen was left to stand for additional 30 minutes. After confirming that the sample was in an equilibrium sink-and-float state, the specific gravity of the specific gravity measuring liquid was measured and then the specific gravity of the sample was calculated. The measurement was carried out five times per one sample, and the average value of the measurements was taken as a specific gravity.

J. L* value

Using a fiber obtained in Examples as a sample, about 2 g of cylindrical knit was produced by using a circular knitting machine NCR-BL manufactured by Eiko Industrial Co., Ltd. (caliber: 3.5 inches (8.9 cm), 27 gauges), and then the cylindrical knit was scoured at 80° C. for 20 minutes in an aqueous solution containing 1.5 g/L of sodium carbonate and 0.5 g/L of a surfactant Gran up US-20 manufactured by Meisei Chemical Works, Ltd., rinsed with running water for 30 minutes, and dried in a hot air dryer at 60° C. for 60 minutes. The scoured cylindrical knit was subjected to dry heat setting at 135° C. for 1 minute, and the dry heat set cylindrical knit was dyed at a bath ratio of 1:100 at 130° C. for 45 minutes in a dyeing solution in which 1.3% by weight of Kayalon Polyester Blue UT-YA produced by Nippon Kayaku Co., Ltd. was added as a disperse dye and whose pH was adjusted to 5.0, and then rinsed with running water for 30 minutes, and dried in a hot air dryer at 60° C. for 60 minutes. The dyed cylindrical knit was subjected to reduction cleaning at a bath ratio of 1:100 at 80° C. for 20 minutes in an aqueous solution containing 2 g/L of sodium hydroxide, 2 g/L of sodium dithionite, and 0.5 g/L of a surfactant Gran up US-20 produced by Meisei Chemical Works, Ltd., then rinsed with running water for 30 minutes, and dried in a hot air dryer at 60° C. for 60 minutes. The reduction cleaned cylindrical knit was subjected to dry heat setting at 135° C. for 1 minute to perform finish setting. Using the finish-set cylindrical knit as a sample, an L* value was measured using a spectrophotometer CM-3700d manufactured by Minolta with a D65 light source at a view angle of 10° under SCE (specular component excluded) optical conditions. The measurement was carried out three times per one sample, and the average value of the measurements was taken as the L* value.

K. Light fastness

The light fastness was evaluated in accordance with JIS L 0843: 2006 (Test Method for Color Fastness to Xenon Arc Lamp Light), Method A. Using a xenon weather meter X25 manufactured by Suga Test Instruments Co., Ltd., a finish-set cylindrical knit prepared in the above J was exposed to light of xenon-arc lamp as a sample, and the degree of discoloration of the specimen was determined with reference to a discoloration gray scale as specified in JIS L 0804: 2004, and light fastness was thereby evaluated.

L. Washing Fastness

Washing fastness evaluation was carried out according to A-2 of JIS L 0844: 2011 (Test Methods for Color Fastness to Washing and Laundering). Using a Laundermeter tester manufactured by Daiei Kagaku Seiki Mfg. Co., Ltd., a finish-set cylindrical knit prepared in the above J as a sample was subjected to laundering treatment along with a piece of attached white cloth (Cotton 3-1, Nylon 7-1) specified in JIS L 0803:2011, and the degree of discoloration of the specimen was determined with reference to a discoloration gray scale as specified in JIS L 0804: 2004, and the washing fastness was thereby evaluated.

M. Rubbing Fastness

Rubbing fastness evaluation was carried out according to the drying test specified in 9.2 rubbing tester type II (Gakushin-Type) method of JIS L 0849: 2013 (Test Methods for Color Fastness to Rubbing). Using a Gakushin-type rubbing tester RT-200 manufactured by Daiei Kagaku Seiki Mfg. Co., Ltd., a finish-set cylindrical knit prepared in the above J as a sample was subjected to rubbing treatment along with a piece of attached white cloth (Cotton 3-1) specified in JIS L 0803:2011, and the degree of staining of the specimen was determined with reference to a gray scale to assess staining as specified in JIS L 0805: 2005, and the rubbing fastness was thereby evaluated.

N. Lightweight Property

For a fiber obtained in Examples, the lightweight property was evaluated based on the specific gravity of the fiber measured in the above I and ranked according to four level criteria S, A, B, and C. As to the level of the evaluation results, S is the best, the level lowers with A and B in order, and C is the worst. A specimen was evaluated as S when the specific gravity of a fiber was less than 0.95, A when it was 0.95 or more and less than 1.0, B when it was 1.0 or more and less than 1.1, and C when it was 1.1 or more, and judged as acceptable when it was ranked as A (0.95 or more and less than 1.0) or higher.

O. Color Developability

The color developability was evaluated based on the L* value measured in the above J and ranked according to four level criteria S, A, B, and C. The smaller the numerical value of L* value, the better the color developability. As to the level of the evaluation results, S is the best, the level lowers with A and B in order, and C is the worst. A specimen was evaluated as S when the L* value was less than 35, A when it was 35 or more and less than 40, B when it was 40 or more and less than 60, and C when it was 60 or more, and judged as acceptable when it was ranked as A (35 or more and less than 40) or higher.

P. Level Dyeability

Finish-set cylindrical knits prepared in the above J were evaluated according to four level criteria S, A, B, and C based on a consultation by five examiners having 5-year or longer experience in quality evaluation. As to the level of the evaluation results, S is the best, the level lowers with A and B in order, and C is the worst. A specimen was ranked as S when it was found dyed highly uniformly with no dyeing specks detected, A when it was found dyed nearly uniformly with almost no dyeing specks detected, B when it was found dyed little uniformly with slight dyeing specks detected, and C when it was found not dyed uniformly with clear dyeing specks detected. A specimen was judged as acceptable when it was ranked as A (the fiber was found dyed nearly uniformly with almost no dyeing specks detected) or higher.

Q. Quality

Finish-set cylindrical knits prepared in the above J were evaluated according to four level criteria S, A, B and C based on a consultation by five examiners having 5-year or longer experience in quality evaluation. As to the level of the evaluation results, S is the best, the level lowers with A and B in order, and C is the worst. A specimen was ranked as S when a vivid and deep color was developed sufficiently and the quality was excellent, A when a vivid and deep color was developed almost sufficiently and the quality was superior, B when almost no vivid and deep color was developed and the quality was poor, and C when no vivid and deep color was developed and the quality was very poor. A specimen was judged as acceptable when it was ranked as A (a vivid and deep color was developed almost sufficiently and the quality was superior) or higher.

R. Maximum Temperature of Sample in Oxidative Exotherm Test

A test was carried out according to the oxidative exotherm test method (acceleration method) of polypropylene fiber specified by Japan Chemical Fibers Association. Using a fiber obtained in Examples as a sample, a cylindrical knit was produced using a circular knitting machine NCR-BL manufactured by Eiko Industrial Co., Ltd. (caliber: 3.5 inches (8.9 cm), 27 gauges) and then subjected to a pretreatment including washing and tumbler drying. The washing was carried out in accordance with the 103 method of JIS L0217: 1995 (Care labelling of textile goods). Specifically, washing using Attack produced by Kao Corporation as a detergent and Haiter (2.3 ml/L) produced by Kao Corporation as a bleaching agent were carried out 10 times, and then the sample dried in a tumbler dryer at 60° C. for 30 minutes. The pretreatment was carried out by repeating 10 times in total a set of ten runs of washing and one run of tumbler drying.

The pretreated cylindrical knit was cut into a circle with a diameter of 50 mm and filled to half the depth of a cylindrical container (25 mm), then a thermocouple was installed at the center of the container, followed by further filling of the pretreated cylindrical knit into the cylindrical container without gaps. The cylindrical container used had an inner diameter of 51 mm and a depth of 50 mm and had 25 holes with a diameter of 5 mm on the lid and the bottom and 140 holes with a diameter of 5 mm on the side wall.

The cylindrical container filled with the pretreated cylindrical knit was placed in a constant temperature dryer set at 150° C., and taking the time when the temperature of the thermocouple set at the center of the cylindrical container (corresponding to the sample temperature) reached 150° C. as 0 minute, a temperature change for 100 hours was recorded and the maximum temperature of the sample measured. The measurement was carried out twice per one sample, and the average value of the measurements taken as the maximum temperature of the sample in the oxidative exotherm test.

S. Fastness to Nitrogen Oxides

Evaluation of fastness to nitrogen oxides was carried out in accordance with JIS L0855:2005 (Test Methods for Color Fastness to Nitrogen Oxides), weak test (one-cycle test). Using a scoured cylindrical knit prepared in the above J as a sample, this was exposed to nitrogen oxides and subjected to post-treatment with a buffer urea solution, and the degree of discoloration of the sample was determined with reference to a discoloration gray scale as specified in JIS L 0804: 2004, and fastness to nitrogen oxides thereby evaluated.

T. Phenolic Yellowing

Evaluation of phenolic yellowing was carried out in accordance with ISO 105-X18:2007. Using a scoured cylindrical knit prepared in the above J as a sample, the degree of discoloration of the sample was determined using a gray scale as specified in ISO 105-A03: 1993, and phenolic yellowing thereby evaluated.

Example 1

Using a twin screw extruder, polypropylene (PP) (Novatec MA2 produced by Japan Polypropylene Corporation, melting peak temperature: 159° C., MFR: 16 g/10 min) and polyethylene terephthalate copolymerized with 5 mol % of 1,4-cyclohexanedicarboxylic acid were melt-kneaded in compounding ratios of 95.2% by weight and 4.8% by weight, respectively, at a kneading temperature of 230° C. with addition of 0.05 parts by weight of 1,3,5-tris[[4-(1,1-dimethylethyl)-3-hydroxy-2,6-dimethylphenyl]methyl]-1,3,5-triazine-2,4,6(1H,3H,5H)-trione (CYANOX 1790, produced by CYTEC), which is a phenol-based compound, 0.05 parts by weight of tris(2,4-di-t-butylphenyl) phosphite (Irgafos 168, produced by BASF), which is a phosphorus-based compound, and 0.5 parts by weight of bis(1-undecanoxy-2,2,6,6-tetramethylpiperidin-4-yl) carbonate (ADK STAB LA-81, produced by ADEKA), which is a hindered amine-based compound, as antioxidants. The strand discharged from the twin screw extruder was cooled in water and then cut by a pelletizer at intervals of about 5 mm to provide pellets. The pellets obtained were vacuum-dried at 95° C. for 12 hours and supplied to an extruder type melt spinning machine in which they were melted and discharged through a spinneret (discharge hole size 0.18 mm, discharge hole length 0.23 mm, number of holes 36, round holes) at a spinning temperature of 250° C. and a discharging rate of 31.5 g/min to provide spun threads. These spun threads were cooled in a cooling air flow with an air temperature of 20° C. and flow speed of 25 m/min, collected while supplying oil from an oil feeder, taken up by a first godet roller rotating at 3,000 m/min, wound up by a winder via a second godet roller rotating at the same speed as the first godet roller to provide an undrawn yarn of 105 dtex-36f. The undrawn yarn obtained was drawn under the conditions of a first hot roller temperature of 90° C., a second hot roller temperature of 130° C., and a draw ratio of 2.1 to provide a drawn yarn of 50 dtex-36f.

Evaluation results of the fiber characteristics and the fabric characteristics of the fiber obtained are shown in Table 1. The dyeable polyolefin fiber obtained had a specific gravity of 0.93 and accordingly had superior lightweight property. In addition, the fiber exhibited vivid and deep color development and was at acceptable levels with respect to color developability and quality because the cyclohexanedicarboxylic acid-copolymerized polyethylene terephthalate being low in refractive index and good in color developability was finely dispersed as an island component in the sea component composed of the polypropylene being low in refractive index. Furthermore, the fabric was good in dye fastness including light fastness, washing fastness and rubbing fastness, and the entire fabric was uniformly dyed and therefore the fabric was good also in level dyeability. The result of the oxidative exotherm test showed that oxidative heat generation was suppressed, and fastness to nitrogen oxides and phenolic yellowing were also good, and yellowing of the fiber was suppressed.

Examples 2 to 7

Stretched yarns were produced in the same manner as in Example 1 except that the copolymerization ratio of cyclohexanedicarboxylic acid was changed as shown in Table 1.

Evaluation results of the fiber characteristics and the fabric characteristics of the fiber obtained are shown in Table 1. With an increase of the copolymerization ratio of cyclohexanedicarboxylic acid, the refractive index decreased, and the L* value also decreased and the color developability was improved. In Examples 3 to 7, the copolymerization ratio of cyclohexanedicarboxylic acid was 30 mol % or more, and cyclohexanedicarboxylic acid-copolymerized polyethylene terephthalate was amorphous so that the degree of exhaustion of the dye increased and it was possible to obtain more vivid and deep color development and both the color developability and the quality were excellent.

Comparative Example 1

A drawn yarn was produced in the same manner as in Example 1 except that the content ratio was changed to 95.2% by weight of polypropylene (PP) and 4.8% by weight of polyethylene terephthalate (PET) (T701T, produced by Toray Industries, Inc., melting peak temperature: 257° C.), the kneading temperature was changed to 280° C. and the spinning temperature was changed to 285° C.

Evaluation results of the fiber characteristics and the fabric characteristics of the fiber obtained are shown in Table 1. Although the polyethylene terephthalate of the island component was dyed well with a dye, exhaustion of the dye was insufficient due to high crystallinity of the polyethylene terephthalate so that no vivid and deep color development was obtained, leading to insufficient color developability, and the quality was at the unacceptable level. Moreover, since the fineness variation value U % (hi) was high and the uniformity in the longitudinal direction of the fiber was insufficient, the level dyeability was poor.

Comparative Example 2, Examples 8 to 12, Comparative Example 3

Stretched yarns were produced in the same manner as in Example 3 except that the content ratio of the polypropylene and the cyclohexanedicarboxylic acid-copolymerized polyethylene terephthalate was changed as shown in Table 2.

The evaluation results of the fiber characteristics and the fabric characteristics of the fibers obtained are shown in Table 2. In Comparative Example 2, which was directed to a fiber made only of a polypropylene, the fiber was hardly dyed with a dye because the polypropylene had no polar functional groups and, therefore, it was very poor in color developability. In each of Examples 8 to 12, the lightweight property, the color developability, the level dyeability, and the quality were all at their acceptable levels for any content ratio. In Comparative Example 3, since the content ratio of the cyclohexanedicarboxylic acid-copolymerized polyethylene terephthalate was high, the sea component was the cyclohexanedicarboxylic acid-copolymerized polyethylene terephthalate and the island component was the polypropylene, leading to high specific gravity and poor lightweight property. In addition, although the color developability was good, the polypropylene of the island component was hardly dyed so that the product lacked level dyeability, vivid and deep color development was not obtained, and the quality was also poor.

Examples 13 to 15

Stretched yarns were produced in the same manner as in Example 3 except using a maleic anhydride-modified polypropylene (POLYBOND 3200 produced by addivant) in Example 13, a maleic anhydride-modified styrene-ethylene-butylene-styrene copolymer (Tuftec M1913 produced by Asahi Kasei Chemicals Corporation) in Example 14, and an amine-modified styrene-ethylene-butylene-styrene copolymer (Dynaron 8660P produced by JSR) in Example 15 and changing the content ratio of the polypropylene, the cyclohexanedicarboxylic acid-copolymerized polyethylene terephthalate, and the compatibilizer as shown in Table 3.

Evaluation results of the fiber characteristics and the fabric characteristics of the fibers obtained are shown in Table 3. In use of any of the compatibilizers, the dispersion diameter of the island component was reduced due to the compatibilizing effect so that vivid and deep color development was obtained well and both the color developability and the quality were excellent. In addition, since the fineness variation value U % (hi) was low and uniformity in the longitudinal direction of the fiber was good due to the compatibilizing effect, the products were excellent also in level dyeability.

Examples 16 to 22

Stretched yarns were produced in the same manner as in Example 15 except changing the content ratio of the polypropylene, the cyclohexanedicarboxylic acid-copolymerized polyethylene terephthalate, and the compatibilizer as shown in Table 3.

Evaluation results of the fiber characteristics and the fabric characteristics of the fibers obtained are shown in Table 3. At any of the content ratios, the lightweight property, the color developability, the level dyeability, and the quality were all at their acceptable levels.

Examples 23 and 24

Stretched yarns were produced in the same manner as in Example 3 except changing 1,4-cyclohexanedicarboxylic acid used in Example 3 to 1,2-cyclohexanedicarboxylic acid in Example 23 and to 1,3-cyclohexanedicarboxylic acid in Example 24.

The evaluation results of the fiber characteristics and the fabric characteristics of the fibers obtained are shown in Table 4. Even in changing the type of cyclohexanedicarboxylic acid, the lightweight property, the color developability, the level dyeability, and the quality were all at their acceptable levels.

Examples 25 to 27

Stretched yarns were produced in the same manners as in Examples 2 to 4 except changing the polypropylene to a polymethylpentene (PMP) (DX 820 produced by Mitsui Chemicals, Inc., melting peak temperature: 232° C., MFR: 180 g/10 min), the kneading temperature to 260° C., and the spinning temperature to 260° C. in Examples 2 to 4.

The evaluation results of the fiber characteristics and the fabric characteristics of the fibers obtained are shown in Table 4. In using the polymethylpentene as a polyolefin, vivid and deep color development was obtained well, and both the color developability and the quality were good. In addition, the lightweight property and the level dyeability are both at their acceptable levels.

Examples 28 and 29

Stretched yarns were produced in the same manners as in Examples 13 and 15 except changing the polypropylene to a polymethylpentene (PMP) (DX 820 produced by Mitsui Chemicals, Inc., melting peak temperature: 232° C., MFR: 180 g/10 min), the kneading temperature to 260° C., and the spinning temperature to 260° C. in Examples 13 and 15.

The evaluation results of the fiber characteristics and the fabric characteristics of the fibers obtained are shown in Table 4. Also in using the polymethylpentene as a polyolefin, the dispersion diameter of the island component was reduced due to the compatibilizing effect of the compatibilizer so that vivid and deep color development was obtained well and both the color developability and the quality were excellent. In addition, since the fineness variation value U % (hi) was low and uniformity in the longitudinal direction of the fiber was good due to the compatibilizing effect, the products were excellent also in level dyeability.

Comparative Examples 4 to 8

Stretched yarns were produced in the same manners as in Examples 2 to 5 and 7 except changing the cyclohexanedicarboxylic acid-copolymerized polyethylene terephthalate to a cyclohexanedimethanol-copolymerized polyethylene terephthalate in Examples 2 to 5 and 7.

Evaluation results of the fiber characteristics and the fabric characteristics of the fibers obtained are shown in Table 5. With an increase in the copolymerization ratio of cyclohexanedimethanol, the refractive index decreased, and the L* value also decreased and the color developability was improved. However, the refractive index tended to be higher than that of the cyclohexanedicarboxylic acid-copolymerized polyethylene terephthalate described in Examples 2 to 5 and 7, and vivid and deep color development was not obtained, and both the color developability and the quality were insufficient. Moreover, the level dyeability was at the unacceptable levels in Comparative Examples 7 and 8.

Comparative Example 9

A drawn yarn was produced in the same manner as in Example 1 except using the polypropylene, the polyethylene terephthalate with 31 mol % of cyclohexanedimethanol having been copolymerized, and a maleic anhydride-modified polypropylene (POLYBOND 3200 produced by addivant) in a content ratio of 95.0/4.8/0.2 with reference to Example 1 disclosed in JP-T-2008-533315.

Evaluation results of the fiber characteristics and the fabric characteristics of the fibers obtained are shown in Table 5. Although the level dyeability was good, vivid and deep color development was not obtained, and the color developability and the quality were at the unacceptable levels.

Comparative Example 10

A drawn yarn was produced in the same manner as in Comparative Example 9 except changing the polyethylene terephthalate with 31 mol % of cyclohexanedimethanol having been copolymerized to a polyethylene terephthalate with 20 mol % of isophthalic acid and 20 mol % of cyclohexanedimethanol having been copolymerized with reference to Example 1 disclosed in JP-T-2001-522947.

Evaluation results of the fiber characteristics and the fabric characteristics of the fibers obtained are shown in Table 5. Although the level dyeability was good, vivid and deep color development was not obtained, and the color developability and the quality were at the unacceptable levels.

Comparative Example 11

To polypropylene (PP) (Novatec MA2, produced by Japan Polypropylene Corporation, melting peak temperature: 159° C., MFR: 16 g/10 min) were added as antioxidants 0.05 parts by weight of a phenol-based compound, 1,3,5-tris[[4-(1,1-dimethylethyl)-3-hydroxy-2,6-dimethylphenyl]methyl]-1,3,5-triazine-2,4,6(1H, 3H,5H)-trione (CYANOX 1790, produced by CYTEC), 0.05 parts by weight of a phosphorus-based compound, tris(2,4-di-t-butylphenyl) phosphite (Irgafos 168, produced by BASF), and 0.5 parts by weight of a hindered amine-based compound, bis(1-undecanoxy-2,2,6,6-tetramethylpiperidin-4-yl) carbonate (ADK STAB LA-81, produced by ADEKA), and then they were kneaded at a kneading temperature of 230° C. using a twin screw extruder. The strand discharged from the twin screw extruder was cooled in water and then cut by a pelletizer at intervals of about 5 mm to provide pellets of a polypropylene to be used as a sea component. A drawn yarn was produced in the same manner as in Example 3 except supplying polypropylene as a sea component and the cyclohexanedicarboxylic acid-copolymerized polyethylene terephthalate as an island component to a pressure melter type conjugate spinning machine, melting them separately, and discharging them through a spinneret designed for islands-in-the-sea type conjugate fiber production (discharge hole size: 0.18 mm, discharge hole length: 0.23 mm, number of islands: 32, number of holes: 36, round holes), and adjusting the content ratio of the sea component and the island component as shown in Table 5.

Evaluation results of the fiber characteristics and the fabric characteristics of the fibers obtained are shown in Table 5. Although the cyclohexanedicarboxylic acid-copolymerized polyethylene terephthalate of the island component was dyed well, vivid and deep color development was not obtained because the polypropylene of the sea component covering the fiber surface layer was hardly dyed, and both the color developability and the quality were at the unacceptable levels. In addition, the entire fabric was not uniformly dyed so that the level dyeability was very poor.

Comparative Examples 12 and 13

A drawn yarn was produced in the same manner as in Example 3 except using the polypropylene pellets prepared in Comparative Example 11 as a polypropylene, supplying the polypropylene and the cyclohexanedicarboxylic acid-copolymerized polyethylene terephthalate to a pressure melter type conjugate spinning machine, melting them separately, and discharging them through a spinneret designed for core-sheath type conjugate fiber production (discharge hole size: 0.18 mm, discharge hole length: 0.23 mm, number of holes: 36, round holes), and adjusting the content ratio of the core component and the sheath component as shown in Table 5. In Comparative Examples 12 and 13, the sea component corresponds to the sheath component and the island component corresponds to the core component.

Evaluation results of the fiber characteristics and the fabric characteristics of the fibers obtained are shown in Table 5. In Comparative Example 12, although the cyclohexanedicarboxylic acid-copolymerized polyethylene terephthalate of the core component was dyed well, the polypropylene of the sheath component covering the fiber surface layer was hardly dyed so that vivid and deep color development was not obtained, and both the color developability and the quality were very poor. In addition, the entire fabric was not uniformly dyed so that the level dyeability was very poor. In Comparative Example 13, although the cyclohexanedicarboxylic acid-copolymerized polyethylene terephthalate of the sheath component covering the fiber surface layer was dyed well, the polypropylene of the core component was hardly dyed so that vivid and deep color development was not obtained, and both the color developability and the quality were very poor. In addition, the entire fabric was not uniformly dyed so that the level dyeability was also at the unacceptable level.

Example 30

A drawn yarn was produced in the same manner as in Example 15 except changing the compounding ratio of the polypropylene, the cyclohexanedicarboxylic acid-copolymerized polyethylene terephthalate, the amine-modified styrene-ethylene-butylene-styrene copolymer as shown in Table 6 and adding no antioxidant in Example 15.

The evaluation results of the fiber characteristics and the fabric characteristics of the fibers obtained are shown in Table 6. Vivid and deep color development was obtained well, and the color developability, the level dyeability, and the quality were all excellent.

Examples 31 to 40

Stretched yarns were prepared in the same manner as in Example 30 except that the type and the amount of the antioxidant were changed as shown in Table 6. With respect to the antioxidant, there were added 3,9-bis[1,1-dimethyl-2-[β-(3-t-butyl-4-hydroxy-5-methylphenyl)propionyloxy]ethyl]-2,4,8,10-tet raoxaspiro[5,5]-undecane (ADK STAB AO-80 produced by ADEKA) as a phenol-based compound in Example 34, pentaerythritol-tetrakis(3-(3,5-di-t-butyl-4-hydroxyphenol)propionate (Irganox 1010 produced by BASF) as a phenol-based compound in Example 35, N—N'—N"—N'''-tetrakis(4,6-bis(butyl-(N-methyl-2,2,6,6-tetramethylpiperidin-4-yl)amino)triazin-2-yl)-4,7-diazadecane-1,10-diamine) (SABOSTAB UV119 produced by SABO) as a hindered amine-based compound in Examples 36 and 37, a polycondensate of dibutylamine-1,3,5-triazine-N,N'-bis(2,2,6,6-tetramethyl-4-piperidyl)-1,6-hexamethylenediamine and N-(2,2,6,6-tetramethyl-4-piperidyl)butylamine (CHIMAS SORB 2020 produced by BASF) as a hindered amine-based compound in Examples 38 and 39, and 3,9-bis(2,6-t-butyl-4-methylphenoxy)-2,4,8,10-tetraoxa-3,9-diphosphaspiro[5,5]undecane (ADK STAB PEP-36 produced by ADEKA) as a phosphorus-based compound in Example 40.

The evaluation results of the fiber characteristics and the fabric characteristics of the fibers obtained are shown in Table 6. Also when the type, the amount and the combination of the antioxidant were changed, vivid and deep color developability was obtained, and the products were excellent in all of color developability, level dyeability, and quality.

TABLE 1

|  |  |  | Example 1 | Example 2 | Example 3 | Example 4 | Example 5 | Example 6 | Example 7 | Comparative Example 1 |
|---|---|---|---|---|---|---|---|---|---|---|
| Sea/Islands combination condition | Sea component (A) | Polymer type | PP | PP | PP | PP | PP | PP | PP | PP |
|  |  | Melting peak temperature [° C.] | 159 | 159 | 159 | 159 | 159 | 159 | 159 | 159 |
|  |  | Aromatic ring concentration [mol/kg] | 0.00 | 0.00 | 0.00 | 0.00 | 0.00 | 0.00 | 0.00 | 0.00 |
|  |  | Refractive Index | 1.483 | 1.483 | 1.483 | 1.483 | 1.483 | 1.483 | 1.483 | 1.483 |
|  | Island component | Polymer type | Copolymerized PET | Copolymerized PET | Copolymerized PET | Copolymerized PET | Copolymerized PET | Copolymerized PET | Copolymerized PET | PET |
|  |  | Copolymerization ratio of cyclo |  |  |  |  |  |  |  |  |

TABLE 1-continued

|  |  |  | Example 1 | Example 2 | Example 3 | Example 4 | Example 5 | Example 6 | Example 7 | Comparative Example 1 |
|---|---|---|---|---|---|---|---|---|---|---|
|  | (B) | hexanedicarboxylic acid [mol %] | 5 | 10 | 30 | 50 | 70 | 90 | 100 | 0 |
|  |  | Melting peak temperature [° C.] |  |  |  |  |  |  |  |  |
|  |  | Aromatic ring concentration [mol/kg] | 239 4.94 | 227 4.67 | N.D. 3.61 | N.D. 2.56 | N.D. 1.53 | N.D. 0.51 | N.D. 0.00 | 257 5.20 |
|  |  | Refractive Index | 1.572 | 1.569 | 1.556 | 1.542 | 1.527 | 1.513 | 1.506 | 1.576 |
|  | Compatibilizer (C) | Functional group | — | — | — | — | — | — | — | — |
|  |  | Main chain | — | — | — | — | — | — | — | — |
|  | Content ratio | Sea component (A)/Island component (B)/compatibilizer (C) [parts by weight] | 95.2/4.8/0.0 | 95.2/4.8/0.0 | 95.2/4.8/0.0 | 95.2/4.8/0.0 | 95.2/4.8/0.0 | 95.2/4.8/0.0 | 95.2/4.8/0.0 | 95.2/4.8/0.0 |
|  | Antioxidant | Phenol-based compound Species | Cyanox 1790 | Cyanox 1790 | Cyanox 1790 | Cyanox 1790 | Cyanox 1790 | Cyanox 1790 | Cyanox 1790 | Cyanox 1790 |
|  |  | Amount [parts by weight] | 0.05 | 0.05 | 0.05 | 0.05 | 0.05 | 0.05 | 0.05 | 0.05 |
|  |  | Phosphorus-based compound Species | Irgafos 168 | Irgafos 168 | Irgafos 168 | Irgafos 168 | Irgafos 168 | Irgafos 168 | Irgafos 168 | Irgafos 168 |
|  |  | Amount [parts by weight] | 0.05 | 0.05 | 0.05 | 0.05 | 0.05 | 0.05 | 0.05 | 0.05 |
|  |  | Hindered amine-based compound Species | ADK STAB LA-81 | ADK STAB LA-81 | ADK STAB LA-81 | ADK STAB LA-81 | ADK STAB LA-81 | ADK STAB LA-81 | ADK STAB LA-81 | ADK STAB LA-81 |
|  |  | Amount [parts by weight] | 0.5 | 0.5 | 0.5 | 0.5 | 0.5 | 0.5 | 0.5 | 0.5 |
|  | Islands-in-the-sea structure formation method |  | Alloy type | Alloy type | Alloy type | Alloy type | Alloy type | Alloy type | Alloy type | Alloy type |
| Fiber characteristics of dyeable polyolefin fiber | Fitness [dtex] |  | 50 | 50 | 50 | 50 | 50 | 50 | 50 | 50 |
|  | Strength [cN/dtex] |  | 4.6 | 4.9 | 5.1 | 5.0 | 4.8 | 4.7 | 4.5 | 4.2 |
|  | Elongation percentage [%] |  | 33 | 31 | 30 | 32 | 34 | 31 | 33 | 27 |
|  | Fitness variation value U % (hi) [%] |  | 1.3 | 0.8 | 0.7 | 0.8 | 0.9 | 1.1 | 1.2 | 1.6 |
|  | Dispersion diameter of island component [nm] |  | 570 | 340 | 240 | 310 | 380 | 490 | 550 | 750 |
|  | Discontinuity of Island component |  | Y | Y | Y | Y | Y | Y | Y | Y |
|  | Specific gravity |  | 0.93 | 0.93 | 0.93 | 0.93 | 0.93 | 0.93 | 0.93 | 0.93 |
| Fabric characteristics of dyeable polyolefin fiber | L * value |  | 39 | 38 | 32 | 30 | 28 | 26 | 24 | 45 |
|  | Light fastness [class] |  | 4-5 | 4-5 | 4-5 | 4 | 4 | 3-4 | 3-4 | 4-5 |
|  | Washing fastness [class] |  | 4-5 | 4-5 | 4-5 | 4 | 3-4 | 3 | 3 | 4-5 |
|  | Rubbing fastness [class] |  | 4 | 4 | 4 | 4 | 4 | 3-4 | 3-4 | 3-4 |
|  | Lightweight property |  | S | S | S | S | S | S | S | S |
|  | Color developability |  | A | A | S | S | S | S | S | B |
|  | Level dyeability |  | A | S | S | S | S | A | A | C |
|  | Quality |  | A | A | S | S | S | S | S | B |
|  | Maximum temperature of sample in oxidative exotherm test [° C.] |  | 150 | 150 | 150 | 150 | 150 | 150 | 150 | 150 |
|  | Fastness to nitrogen oxides [class] |  | 4-5 | 4-5 | 4-5 | 4-5 | 4-5 | 4-5 | 4-5 | 4-5 |
|  | Phenolic yellowing [class] |  | 4-5 | 4-5 | 4-5 | 4-5 | 4-5 | 4-5 | 4-5 | 4-5 |

PP: polypropylene,
PET: polyethylene terephthalate,
N.D.: not detected

TABLE 2

|  |  |  | Comparative Example 2 | Example 8 | Example 9 | Example 10 | Example 11 | Example 12 | Comparative Example 3 |
|---|---|---|---|---|---|---|---|---|---|
| Sea/Islands combination | Sea component (A) | Polymer type | PP | PP | PP | PP | PP | PP | Copolymerized PET |
|  |  | Copolymerization ratio of cyclohexane- | — | — | — | — | — | — | 30 |

TABLE 2-continued

|  |  |  | Comparative Example 2 | Example 8 | Example 9 | Example 10 | Example 11 | Example 12 | Comparative Example 3 |
|---|---|---|---|---|---|---|---|---|---|
| condition | | dicarboxylic acid [mol %] | | | | | | | |
| | | Melting peak temperature [° C.] | 159 | 159 | 159 | 159 | 159 | 159 | N.D. |
| | | Aromatic ring concentration [mol/kg] | 0.00 | 0.00 | 0.00 | 0.00 | 0.00 | 0.00 | 3.61 |
| | | Refractive Index | 1.483 | 1.483 | 1.483 | 1.483 | 1.483 | 1.483 | 1.556 |
| | Island component (B) | Polymer type | — | Copolymerized PET | Copolymerized PET | Copolymerized PET | Copolymerized PET | Copolymerized PET | PP |
| | | Copolymerization ratio of cyclohexane-dicarboxylic acid [mol %] | — | 30 | 30 | 30 | 30 | 30 | — |
| | | Melting peak temperature [° C.] | — | N.D. | N.D. | N.D. | N.D. | N.D. | 159 |
| | | Aromatic ring concentration [mol/kg] | — | 3.61 | 3.61 | 3.61 | 3.61 | 3.61 | 0.00 |
| | | Refractive Index | — | 1.556 | 1.556 | 1.556 | 1.556 | 1.556 | 1.483 |
| | Compatibilizer (C) | Functional group | — | — | — | — | — | — | — |
| | | Main chain | — | — | — | — | — | — | — |
| | Content ratio | Sea component (A)/Island component (B)/compatibilizer (C) [parts by weight] | 100.0/0.0/0.0 | 97.0/3.0/0.0 | 90.0/10.0/0.0 | 85.0/15.0/0.0 | 80.0/20.0/0.0 | 70.0/30.0/0.0 | 70.0/30.0/0.0 |
| | Antioxidant | Phenol-based compound Species | Cyanox 1790 | Cyanox 1790 | Cyanox 1790 | Cyanox 1790 | Cyanox 1790 | Cyanox 1790 | Cyanox 1790 |
| | | Amount [parts by weight] | 0.05 | 0.05 | 0.05 | 0.05 | 0.05 | 0.05 | 0.05 |
| | | Phosphorus-based compound Species | Irgafos 168 | Irgafos 168 | Irgafos 168 | Irgafos 168 | Irgafos 168 | Irgafos 168 | Irgafos 168 |
| | | Amount [parts by weight] | 0.05 | 0.05 | 0.05 | 0.05 | 0.05 | 0.05 | 0.05 |
| | | Hindered amine-based compound Species | ADK STAB LA-81 | ADK STAB LA-81 | ADK STAB LA-81 | ADK STAB LA-81 | ADK STAB LA-81 | ADK STAB LA-81 | ADK STAB LA-81 |
| | | Amount [parts by weight] | 0.5 | 0.5 | 0.5 | 0.5 | 0.5 | 0.5 | 0.5 |
| | Islands-in-the-sea structure formation method | | Single component | Alloy type | Alloy type | Alloy type | Alloy type | Alloy type | Alloy type |
| Fiber characteristics of dyeable polyolefin fiber | Fitness [dtex] | | 50 | 50 | 50 | 50 | 50 | 50 | 50 |
| | Strength [cN/dtex] | | 5.7 | 5.2 | 4.9 | 4.5 | 4.2 | 3.7 | 2.7 |
| | Elongation percentage [%] | | 35 | 31 | 34 | 32 | 33 | 30 | 32 |
| | Fitness variation value U % (hi) [%] | | 0.4 | 0.6 | 0.8 | 1.0 | 1.2 | 1.4 | 1.7 |
| | Dispersion diameter of island component [nm] | | — | 190 | 290 | 370 | 420 | 530 | 620 |
| | Discontinuity of Island component | | — | Y | Y | Y | Y | Y | Y |
| | Specific gravity | | 0.91 | 0.92 | 0.95 | 0.97 | 0.98 | 0.99 | 1.17 |
| Fabric characteristics of dyeable polyolefin fiber | L* value | | 91 | 39 | 30 | 29 | 28 | 26 | 23 |
| | Light fastness [class] | | 3 | 5 | 4-5 | 4 | 4 | 3-4 | 3 |
| | Washing fastness [class] | | 2 | 4-5 | 4 | 4 | 3-4 | 3 | 3 |
| | Rubbing fastness [class] | | 2-3 | 4-5 | 4 | 4 | 3-4 | 3-4 | 3 |
| | Lightweight property | | S | S | A | A | A | A | C |
| | Color developability | | C | A | S | S | S | S | S |
| | Level dyeability | | B | S | S | S | A | A | B |
| | Quality | | C | A | S | S | S | S | B |
| | Maximum temperature of sample in oxidative exotherm test [° C.] | | 150 | 150 | 150 | 150 | 150 | 150 | 150 |
| | Fastness to nitrogen oxides [class] | | 4-5 | 4-5 | 4-5 | 4-5 | 4-5 | 4-5 | 4-5 |
| | Phenolic yellowing [class] | | 4-5 | 4-5 | 4-5 | 4-5 | 4-5 | 4-5 | 4-5 |

PP: polypropylene,
PET: polyethylene terephthalate,
N.D.: not detected

TABLE 3

|  |  |  | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| Sea/Islands com | Sea component | Polymer type | PP | PP | PP | PP | PP | PP | PP | PP | PP | PP |
| | | Melting peak temperature [° C.] | 159 | 159 | 159 | 159 | 159 | 159 | 159 | 159 | 159 | 159 |

TABLE 3-continued

|  |  |  |  | Example 13 | Example 14 | Example 15 | Example 16 | Example 17 | Example 18 | Example 19 | Example 20 | Example 21 | Example 22 |
|---|---|---|---|---|---|---|---|---|---|---|---|---|---|
| bination condition | (A) | Aromatic ring concentration [mol/kg] |  | 0.00 | 0.00 | 0.00 | 0.00 | 0.00 | 0.00 | 0.00 | 0.00 | 0.00 | 0.00 |
|  |  | Refractive Index |  | 1.483 | 1.483 | 1.483 | 1.483 | 1.483 | 1.483 | 1.483 | 1.483 | 1.483 | 1.483 |
|  | Island component (B) | Polymer type |  | Copolymerized PET | Copolymerized PET | Copolymerized PET | Copolymerized PET | Copolymerized PET | Copolymerized PET | Copolymerized PET | Copolymerized PET | Copolymerized PET | Copolymerized PET |
|  |  | Copolymerization ratio of cyclohexanedi-carboxylic acid [mol %] |  | 30 | 30 | 30 | 30 | 30 | 30 | 30 | 30 | 30 | 30 |
|  |  | Melting peak temperature [° C.] |  | N.D. | N.D. | N.D. | N.D. | N.D. | N.D. | N.D. | N.D. | N.D. | N.D. |
|  |  | Aromatic ring concentration [mol/kg] |  | 3.61 | 3.61 | 3.61 | 3.61 | 3.61 | 3.61 | 3.61 | 3.61 | 3.61 | 3.61 |
|  |  | Refractive Index |  | 1.556 | 1.556 | 1.556 | 1.556 | 1.556 | 1.556 | 1.556 | 1.556 | 1.556 | 1.556 |
|  | Compatibilizer (C) | Functional group |  | Acid anhydride group | Acid anhydride group | Amino group | Amino group | Amino group | Amino group | Amino group | Amino group | Amino group | Amino group |
|  |  | Main chain |  | PP | SEBS | SEBS | SEBS | SEBS | SEBS | SEBS | SEBS | SEBS | SEBS |
|  | Content ratio | Sea component (A)/ Island component (B)/ compatibilizer (C)[parts by weight] |  | 95.0/ 4.8/0.2 | 95.0/ 4.8/0.2 | 95.0/ 4.8/0.2 | 95.1/ 4.8/0.1 | 94.7/ 4.8/0.5 | 94.2/ 4.8/1.0 | 88.0/ 10.0/2.0 | 85.0/ 10.0/5.0 | 80.0/ 10.0/10.0 | 70.0/ 10.0/20.0 |
|  | Antioxidant | Phenol-based compound | Species | Cyanox 1790 | Cyanox 1790 | Cyanox 1790 | Cyanox 1790 | Cyanox 1790 | Cyanox 1790 | Cyanox 1790 | Cyanox 1790 | Cyanox 1790 | Cyanox 1790 |
|  |  |  | Amount [parts by weight] | 0.05 | 0.05 | 0.05 | 0.05 | 0.05 | 0.05 | 0.05 | 0.05 | 0.05 | 0.05 |
|  |  | Phosphorus-based compound | Species | Irgafos 168 | Irgafos 168 | Irgafos 168 | Irgafos 168 | Irgafos 168 | Irgafos 168 | Irgafos 168 | Irgafos 168 | Irgafos 168 | Irgafos 168 |
|  |  |  | Amount [parts by weight] | 0.05 | 0.05 | 0.05 | 0.05 | 0.05 | 0.05 | 0.05 | 0.05 | 0.05 | 0.05 |
|  |  | Hindered amine-based compound | Species | ADK STAB LA-81 | ADK STAB LA-81 | ADK STAB LA-81 | ADK STAB LA-81 | ADK STAB LA-81 | ADK STAB LA-81 | ADK STAB LA-81 | ADK STAB LA-81 | ADK STAB LA-81 | ADK STAB LA-81 |
|  |  |  | Amount [parts by weight] | 0.5 | 0.5 | 0.5 | 0.5 | 0.5 | 0.5 | 0.5 | 0.5 | 0.5 | 0.5 |
|  | Islands-in-the-sea structure formation method |  |  | Alloy type | Alloy type | Alloy type | Alloy type | Alloy type | Alloy type | Alloy type | Alloy type | Alloy type | Alloy type |
| Fiber characteristics of dyeable polyolefin fiber | Fitness [dtex] |  |  | 50 | 50 | 50 | 50 | 50 | 50 | 50 | 50 | 50 | 50 |
|  | Strength [cN/dtex] |  |  | 5.3 | 5.4 | 5.6 | 5.3 | 5.5 | 5.3 | 5.3 | 5.2 | 5.2 | 5.0 |
|  | Elongation percentage [%] |  |  | 34 | 33 | 35 | 32 | 31 | 35 | 33 | 34 | 30 | 31 |
|  | Fitness variation value U % (hi) [%] |  |  | 0.6 | 0.5 | 0.4 | 0.7 | 0.5 | 0.7 | 0.6 | 0.6 | 0.7 | 0.8 |
|  | Dispersion diameter of island component [nm] |  |  | 210 | 170 | 130 | 200 | 110 | 90 | 210 | 190 | 180 | 160 |
|  | Discontinuity of Island component |  |  | Y | Y | Y | Y | Y | Y | Y | Y | Y | Y |
|  | Specific gravity |  |  | 0.93 | 0.93 | 0.93 | 0.93 | 0.93 | 0.93 | 0.95 | 0.95 | 0.95 | 0.95 |
| Fabric characteristics of dyeable polyolefin fiber | L * value |  |  | 31 | 30 | 28 | 30 | 27 | 27 | 27 | 26 | 26 | 26 |
|  | Light fastness [class] |  |  | 4-5 | 4-5 | 4-5 | 4-5 | 4-5 | 4-5 | 4-5 | 4-5 | 4 | 4 |
|  | Washing fastness [class] |  |  | 4-5 | 4-5 | 4-5 | 4-5 | 4-5 | 4 | 4 | 4 | 3-4 | 3-4 |
|  | Rubbing fastness [class] |  |  | 4 | 4-5 | 4-5 | 4-5 | 4-5 | 4 | 4-5 | 4-5 | 4 | 4 |
|  | Lightweight property |  |  | S | S | S | S | S | S | A | A | A | A |
|  | Color developability |  |  | S | S | S | S | S | S | S | S | S | S |
|  | Level dyeability |  |  | S | S | S | S | S | S | S | S | S | S |
|  | Quality |  |  | S | S | S | S | S | S | S | S | S | S |
|  | Maximum temperature of sample in oxidative exotherm test [° C.] |  |  | 150 | 150 | 150 | 150 | 150 | 150 | 150 | 150 | 150 | 150 |
|  | Fastness to nitrogen oxides [class] |  |  | 4-5 | 4-5 | 4-5 | 4-5 | 4-5 | 4-5 | 4-5 | 4-5 | 4-5 | 4-5 |
|  | Phenolic yellowing [class] |  |  | 4-5 | 4-5 | 4-5 | 4-5 | 4-5 | 4-5 | 4-5 | 4-5 | 4-5 | 4-5 |

PP: polypropylene,
PET: polyethylene terephthalate,
SEBS: styrene-ethylene-butylene-styrene,
N.D.: not detected

TABLE 4

| | | | Example 23 | Example 24 | Example 25 | Example 26 | Example 27 | Example 28 | Example 29 |
|---|---|---|---|---|---|---|---|---|---|
| Sea/Islands combination condition | Sea component (A) | Polymer type | PP | PP | PMP | PMP | PMP | PMP | PMP |
| | | Melting peak temperature [° C.] | 159 | 159 | 232 | 232 | 232 | 232 | 232 |
| | | Aromatic ring concentration [mol/kg] | 0.00 | 0.00 | 0.00 | 0.00 | 0.00 | 0.00 | 0.00 |
| | | Refractive Index | 1.483 | 1.483 | 1.463 | 1.463 | 1.463 | 1.463 | 1.463 |
| | Island component (B) | Polymer type | Copolymerized PET | Copolymerized PET | Copolymerized PET | Copolymerized PET | Copolymerized PET | Copolymerized PET | Copolymerized PET |
| | | Copolymerization ratio of cyclohexanedicarboxylic acid [mol %] | 30 | 30 | 10 | 30 | 50 | 30 | 30 |
| | | Melting peak temperature [° C.] | N.D. | N.D. | N.D. | N.D. | N.D. | N.D. | N.D. |
| | | Aromatic ring concentration [mol/kg] | 3.61 | 3.61 | 3.61 | 3.61 | 3.61 | 3.61 | 3.61 |
| | | Refractive Index | 1.554 | 1.558 | 1.569 | 1.556 | 1.542 | 1.556 | 1.556 |
| | Compatibilizer (C) | Functional group | — | — | — | — | — | Acid anhydride group | Amino anhydride group |
| | | Main chain | — | — | — | — | — | PP | SEBS |
| | Content ratio | Sea component (A)/Island component (B)/compatibilizer (C) [parts by weight] | 95.2/4.8/0.0 | 95.2/4.8/0.0 | 95.2/4.8/0.0 | 95.2/4.8/0.0 | 95.2/4.8/0.0 | 95.0/4.8/0.2 | 95.0/4.8/0.2 |
| | Antioxidant | Phenol-based compound Species | Cyanox 1790 | Cyanox 1790 | Cyanox 1790 | Cyanox 1790 | Cyanox 1790 | Cyanox 1790 | Cyanox 1790 |
| | | Phenol-based compound Amount [parts by weight] | 0.05 | 0.05 | 0.05 | 0.05 | 0.05 | 0.05 | 0.05 |
| | | Phosphorus-based compound Species | Irgafos 168 | Irgafos 168 | Irgafos 168 | Irgafos 168 | Irgafos 168 | Irgafos 168 | Irgafos 168 |
| | | Phosphorus-based compound Amount [parts by weight] | 0.05 | 0.05 | 0.05 | 0.05 | 0.05 | 0.05 | 0.05 |
| | | Hindered amine-based compound Species | ADK STAB LA-81 | ADK STAB LA-81 | ADK STAB LA-81 | ADK STAB LA-81 | ADK STAB LA-81 | ADK STAB LA-81 | ADK STAB LA-81 |
| | | Hindered amine-based compound Amount [parts by weight] | 0.5 | 0.5 | 0.5 | 0.5 | 0.5 | 0.5 | 0.5 |
| | Islands-in-the-sea structure formation method | | Alloy type | Alloy type | Alloy type | Alloy type | Alloy type | Alloy type | Alloy type |
| Fiber characteristics of dyeable polyolefin fiber | Fitness [dtex] | | 50 | 50 | 50 | 50 | 50 | 50 | 50 |
| | Strength [cN/dtex] | | 4.6 | 4.8 | 2.2 | 2.4 | 2.3 | 2.6 | 2.8 |
| | Elongation percentage [%] | | 27 | 29 | 30 | 28 | 29 | 33 | 32 |
| | Fitness variation value U % (hi) [%] | | 0.7 | 0.7 | 0.8 | 0.7 | 0.9 | 0.6 | 0.4 |
| | Dispersion diameter of island component [nm] | | 260 | 250 | 370 | 260 | 330 | 230 | 150 |
| | Discontinuity of Island component | | Y | Y | Y | Y | Y | Y | Y |
| | Specific gravity | | 0.93 | 0.93 | 0.85 | 0.85 | 0.85 | 0.85 | 0.85 |
| Fabric characteristics of dyeable polyolefin fiber | L * value | | 32 | 33 | 37 | 31 | 29 | 30 | 27 |
| | Light fastness [class] | | 4-5 | 4-5 | 4-5 | 4-5 | 4 | 4-5 | 4-5 |
| | Washing fastness [class] | | 4-5 | 4-5 | 4-5 | 4-5 | 4 | 4-5 | 4-5 |
| | Rubbing fastness [class] | | 4 | 4 | 4 | 4 | 4 | 4-5 | 4-5 |
| | Lightweight property | | S | S | S | S | S | S | S |
| | Color developability | | S | S | A | S | S | S | S |
| | Level dyeability | | S | S | S | S | S | S | S |
| | Quality | | S | S | A | S | S | S | S |
| | Maximum temperature of sample in oxidative exotherm test [° C.] | | 150 | 150 | 150 | 150 | 150 | 150 | 150 |
| | Fastness to nitrogen oxides [class] | | 4-5 | 4-5 | 4-5 | 4-5 | 4-5 | 4-5 | 4-5 |
| | Phenolic yellowing [class] | | 4-5 | 4-5 | 4-5 | 4-5 | 4-5 | 4-5 | 4-5 |

PP: polypropylene,
PMP: polymethylpentene,
PET: polyethylene terephthalate,
SEBS: styrene-ethylene-butylene-styrene,
N.D.: not detected

TABLE 5

| | | | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|
| Sea/Islands combination condition | Sea component (A) | Polymer type | PP | PP | PP | PP | PP | PP | PP | PP | PP | Copolymerized PET |
| | | Copolymerization ratio of cyclohexanedicarboxylic acid [mol %] | — | — | — | — | — | — | — | — | — | 30 |
| | | Melting peak temperature [° C.] | 159 | 159 | 159 | 159 | 159 | 159 | 159 | 159 | 159 | N.D. |

TABLE 5-continued

|  |  |  | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|
|  |  | Aromatic ring concentration [mol/kg] | 0.00 | 0.00 | 0.00 | 0.00 | 0.00 | 0.00 | 0.00 | 0.00 | 0.00 | 3.61 |
|  |  | Refractive Index | 1.483 | 1.483 | 1.483 | 1.483 | 1.483 | 1.483 | 1.483 | 1.483 | 1.483 | 1.556 |
|  | Island component (B) | Polymer type | Copolymerized PET | Copolymerized PET | Copolymerized PET | Copolymerized PET | Copolymerized PET | Copolymerized PET | Copolymerized PET | Copolymerized PET | Copolymerized PET | PP |
|  |  | Copolymerization ratio of cyclohexanedicarboxylic acid [mol %] | — | — | — | — | — | — | — | 30 | 30 | — |
|  |  | Coplymerization ratio of isophthalic acid [mol %] | — | — | — | — | — | — | 20 | — | — | — |
|  |  | Copolymerization ratio of cyclohexanedimethanol [mol %] | 10 | 30 | 50 | 70 | 100 | 31 | 20 | — | — | — |
|  |  | Melting peak temperature [° C.] | 230 | N.D. | N.D. | N.D. | N.D. | N.D. | N.D. | N.D. | N.D. | 159 |
|  |  | Aromatic ring concentration [mol/kg] | 4.99 | 4.61 | 4.29 | 4.01 | 3.65 | 4.59 | 3.83 | 3.61 | 3.61 | 0.00 |
|  |  | Refractive Index | 1.574 | 1.570 | 1.568 | 1.562 | 1.556 | 1.569 | 1.557 | 1.556 | 1.556 | 1.483 |
|  | Compatibilizer (C) | Functional group | — | — | — | — | — | Acid anhydride group | Acid anhydride group | — | — | — |
|  |  | Main chain | — | — | — | — | — | PP | PP | — | — | — |
|  | Content ratio | Sea component (A)/ Island component (B)/ compatibilizer (C) [parts by weight] | 95.2/ 4.8/0.0 | 95.2/ 4.8/0.0 | 95.2/ 4.8/0.0 | 95.2/ 4.8/0.0 | 95.2/ 4.8/0.0 | 95.0/ 4.8/0.2 | 95.0/ 4.8/0.2 | 95.2/ 4.8/0.0 | 95.2/ 4.8/0.0 | 4.8/ 95.2/0.0 |
|  | Antioxidant | Phenol-based compound Species | Cyanox 1790 | Cyanox 1790 | Cyanox 1790 | Cyanox 1790 | Cyanox 1790 | Cyanox 1790 | Cyanox 1790 | Cyanox 1790 | Cyanox 1790 | Cyanox 1790 |
|  |  | Amount [parts by weight] | 0.05 | 0.05 | 0.05 | 0.05 | 0.05 | 0.05 | 0.05 | 0.05 | 0.05 | 0.05 |
|  |  | Phosphorus-based compound Species | Irgafos 168 | Irgafos 168 | Irgafos 168 | Irgafos 168 | Irgafos 168 | Irgafos 168 | Irgafos 168 | Irgafos 168 | Irgafos 168 | Irgafos 168 |
|  |  | Amount [parts by weight] | 0.05 | 0.05 | 0.05 | 0.05 | 0.05 | 0.05 | 0.05 | 0.05 | 0.05 | 0.05 |
|  |  | Hindered amine-based compound Species | ADK STAB | ADK STAB | ADK STAB | ADK STAB | ADK STAB | ADK STAB | ADK STAB | ADK STAB | ADK STAB | ADK STAB |
|  |  |  | LA-81 | LA-81 | LA-81 | LA-81 | LA-81 | LA-81 | LA-81 | LA-81 | LA-81 | LA-81 |
|  |  | Amount [parts by weight] | 0.5 | 0.5 | 0.5 | 0.5 | 0.5 | 0.5 | 0.5 | 0.5 | 0.5 | 0.5 |
|  | Islands-in-the-sea structure formation method |  | Alloy type | Alloy type | Alloy type | Alloy type | Alloy type | Alloy type | Alloy type | Islands-in-the-sea type | Sheath/core type | Sheath/core type |
| Fiber characteristics of dyeable polyolefin fiber | Fitness [dtex] |  | 50 | 50 | 50 | 50 | 50 | 50 | 50 | 50 | 50 | 50 |
|  | Strength [cN/dtex] |  | 4.7 | 4.8 | 4.8 | 4.6 | 4.3 | 4.9 | 4.8 | 5.2 | 5.3 | 5.3 |
|  | Elongation percentage [%] |  | 30 | 31 | 33 | 32 | 35 | 33 | 34 | 31 | 33 | 32 |
|  | Fitness variation value U % (hi) [%] |  | 1.0 | 0.9 | 1.0 | 1.1 | 1.4 | 0.9 | 0.9 | 0.6 | 0.5 | 0.5 |
|  | Dispersion diameter of island component [nm] |  | 410 | 290 | 370 | 460 | 670 | 250 | 270 | 490 | 2600 | 13600 |
|  | Discontinuity of Island component |  | Y | Y | Y | Y | Y | Y | Y | N | N | N |
|  | Specific gravity |  | 0.93 | 0.93 | 0.93 | 0.93 | 0.93 | 0.93 | 0.93 | 0.93 | 0.93 | 0.93 |
| Fabric characteristics of | L* value |  | 43 | 42 | 42 | 41 | 41 | 42 | 42 | 57 | 72 | 66 |
|  | Light fastness [class] |  | 4 | 4 | 3-4 | 3-4 | 3 | 4 | 4 | 4 | 3 | 3 |
|  | Washing fastness [class] |  | 4 | 4 | 3 | 3 | 3 | 4 | 4 | 4-5 | 2 | 3-4 |
|  | Rubbing fastness [class] |  | 3-4 | 3-4 | 3 | 3 | 3 | 3-4 | 3-4 | 4 | 2-3 | 1-2 |

TABLE 5-continued

|  |  | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|
| dyeable polyolefin fiber | Lightweight property | S | S | S | S | S | S | S | S | S | S |
|  | Color developability | B | B | B | B | B | B | B | B | C | C |
|  | Level dyeability | A | A | A | B | B | A | A | C | C | B |
|  | Quality | B | B | B | B | B | B | B | B | C | C |
|  | Maximum temperature of sample in oxidative exotherm test [° C.] | 150 | 150 | 150 | 150 | 150 | 150 | 150 | 150 | 150 | 150 |
|  | Fastness to nitrogen oxides [class] | 4-5 | 4-5 | 4-5 | 4-5 | 4-5 | 4-5 | 4-5 | 4-5 | 4-5 | 4-5 |
|  | Phenolic yellowing [class] | 4-5 | 4-5 | 4-5 | 4-5 | 4-5 | 4-5 | 4-5 | 4-5 | 4-5 | 4-5 |

PP: polypropylene,
PET: polyethylene terephthalate,
N.D.: not detected

TABLE 6

|  |  |  | Example 30 | Example 31 | Example 32 | Example 33 | Example 34 | Example 35 | Example 36 | Example 37 | Example 38 | Example 39 | Example 40 |
|---|---|---|---|---|---|---|---|---|---|---|---|---|---|
| Sea/Islands combination condition | Sea component (A) | Polymer type | PP | PP | PP | PP | PP | PP | PP | PP | PP | PP | PP |
|  |  | Melting peak temperature [° C.] | 159 | 159 | 159 | 159 | 159 | 159 | 159 | 159 | 159 | 159 | 159 |
|  |  | Aromatic ring concentration [mol/kg] | 0.00 | 0.00 | 0.00 | 0.00 | 0.00 | 0.00 | 0.00 | 0.00 | 0.00 | 0.00 | 0.00 |
|  |  | Refractive Index | 1.483 | 1.483 | 1.483 | 1.483 | 1.483 | 1.483 | 1.483 | 1.483 | 1.483 | 1.483 | 1.483 |
|  | Island component (B) | Polymer type | Copolymerized PET | Copolymerized PET | Copolymerized PET | Copolymerized PET | Copolymerized PET | Copolymerized PET | Copolymerized PET | Copolymerized PET | Copolymerized PET | Copolymerized PET | Copolymerized PET |
|  |  | Copolymerization ratio of cyclo hexanedicarboxylic acid [mol %] | 30 | 30 | 30 | 30 | 30 | 30 | 30 | 30 | 30 | 30 | 30 |
|  |  | Melting peak temperature [° C.] | N.D. | N.D. | N.D. | N.D. | N.D. | N.D. | N.D. | N.D. | N.D. | N.D. | N.D. |
|  |  | Aromatic ring concentration [mol/kg] | 3.61 | 3.61 | 3.61 | 3.61 | 3.61 | 3.61 | 3.61 | 3.61 | 3.61 | 3.61 | 3.61 |
|  |  | Refractive Index | 1.556 | 1.556 | 1.556 | 1.556 | 1.556 | 1.556 | 1.556 | 1.556 | 1.556 | 1.556 | 1.556 |
|  | Compatibilizer (C) | Functional group | Amino group | Amino group | Amino group | Amino group | Amino group | Amino group | Amino group | Amino group | Amino group | Amino group | Amino group |
|  |  | Main chain | SEBS | SEBS | SEBS | SEBS | SEBS | SEBS | SEBS | SEBS | SEBS | SEBS | SEBS |
|  | Content ratio | Sea component (A)/Island component (B)/compatibilizer (C) [parts by weight] | 92.0/7.5/0.5 | 92.0/7.5/0.5 | 92.0/7.5/0.5 | 92.0/7.5/0.5 | 92.0/7.5/0.5 | 92.0/7.5/0.5 | 92.0/7.5/0.5 | 92.0/7.5/0.5 | 92.0/7.5/0.5 | 92.0/7.5/0.5 | 92.0/7.5/0.5 |
|  | Antioxidant | Phenol-based compound Species | — | — | Cyanox 1790 | Cyanox 1790 | Cyanox 1790 | Cyanox 1790 | Cyanox 1790 | Cyanox 1790 | Cyanox 1790 | Cyanox 1790 | Cyanox 1790 |
|  |  | Amount [parts by weight] | — | — | 0.05 | 0.05 | 0.05 | 0.05 | 0.05 | 0.05 | 0.05 | 0.05 | 0.05 |
|  |  | Phosphorus-based compound Species | — | Irgafos-168 | — | Irgafos-168 | Irgafos-168 | Irgafos-168 | Irgafos-168 | Irgafos-168 | Irgafos-168 | Irgafos-168 | ADK STAB PEP-36 |
|  |  | Amount [parts by weight] | — | 0.05 | — | 0.05 | 0.05 | 0.05 | 0.05 | 0.05 | 0.05 | 0.05 | 0.05 |
|  |  | Hindered amine-based compound Species | — | ADK-STAB LA-81 | ADK-STAB LA-81 | — | ADK-STAB LA-81 | ADK-STAB LA-81 | SABO-STAB UV119 | SABO-STAB UV119 | Chimassorb 2020 | Chimassorb 2020 | ADK STAB LA-81 |
|  |  | Amount [parts by weight] | — | 0.5 | 0.5 | — | 0.5 | 0.5 | 0.05 | 0.5 | 0.5 | 0.5 | 0.5 |
|  | Islands-in-the-sea structure formation method |  | Alloy type | Alloy type | Alloy type | Alloy type | Alloy type | Alloy type | Alloy type | Alloy type | Alloy type | Alloy type | Alloy type |
| Fiber characteristics | Fitness [dtex] |  | 50 | 50 | 50 | 50 | 50 | 50 | 50 | 50 | 50 | 50 | 50 |
|  | Strength [cN/dtex] |  | 5.1 | 4.9 | 5.0 | 4.8 | 5.2 | 5.1 | 5.0 | 4.8 | 4.9 | 4.9 | 5.0 |
|  | Elongation percentage [%] |  | 35 | 37 | 36 | 35 | 34 | 36 | 33 | 35 | 37 | 34 | 36 |

TABLE 6-continued

|  |  | Example 30 | Example 31 | Example 32 | Example 33 | Example 34 | Example 35 | Example 36 | Example 37 | Example 38 | Example 39 | Example 40 |
|---|---|---|---|---|---|---|---|---|---|---|---|---|
| of dyeable polyolefin fiber | Fitness variation value U % (hi) [%] | 0.4 | 0.4 | 0.5 | 0.4 | 0.5 | 0.4 | 0.3 | 0.5 | 0.5 | 0.4 | 0.4 |
|  | Dispersion diameter of island component [nm] | 130 | 140 | 140 | 150 | 130 | 140 | 150 | 120 | 120 | 130 | 140 |
|  | Discontinuity of Island component | Y | Y | Y | Y | Y | Y | Y | Y | Y | Y | Y |
|  | Specific gravity | 0.93 | 0.93 | 0.93 | 0.93 | 0.93 | 0.93 | 0.93 | 0.93 | 0.93 | 0.93 | 0.93 |
| Fabric characteristics of dyeable polyolefin fiber | L * value | 27 | 28 | 26 | 27 | 27 | 28 | 28 | 26 | 27 | 28 | 27 |
|  | Light fastness [class] | 4-5 | 4-5 | 4-5 | 4-5 | 4-5 | 4-5 | 4-5 | 4-5 | 4-5 | 4-5 | 4-5 |
|  | Washing fastness [class] | 4-5 | 4-5 | 4-5 | 4-5 | 4-5 | 4-5 | 4-5 | 4-5 | 4-5 | 4-5 | 4-5 |
|  | Rubbing fastness [class] | 4-5 | 4-5 | 4-5 | 4-5 | 4-5 | 4-5 | 4-5 | 4-5 | 4-5 | 4-5 | 4-5 |
|  | Lightweight property | S | S | S | S | S | S | S | S | S | S | S |
|  | Color developability | S | S | S | S | S | S | S | S | S | S | S |
|  | Level dyeability | S | S | S | S | S | S | S | S | S | S | S |
|  | Quality | S | S | S | S | S | S | S | S | S | S | S |
|  | Maximum temperature of sample in oxidative exotherm test [° C.] | 167 | 150 | 150 | 150 | 150 | 150 | 166 | 150 | 168 | 150 | 150 |
|  | Fastness to nitrogen oxides [class] | 4-5 | 4-5 | 4-5 | 4-5 | 4-5 | 4 | 4 | 4 | 3-4 | 3 | 4-5 |
|  | Phenolic yellowing [class] | 4-5 | 4-5 | 4-5 | 4-5 | 4-5 | 4 | 4 | 3-4 | 3 | 2-3 | 4-5 |

PP: polypropylene,
PET: polyethylene terephthalate,
SEBS: styrene-ethylene-butylene-styrene,
N.D.: not detected

INDUSTRIAL APPLICABILITY

The dyeable polyolefin fiber is an item in which vivid and deep color developability has been provided to a polyolefin fiber inherently superior in lightweight property and its oxidative decomposition during tumbler drying and its yellowing during long-term storage are suppressed and, therefore, it can be suitably employed as a fibrous structure.

The invention claimed is:

1. A dyeable polypropylene fiber comprising a polymer alloy fiber having an islands-in-a-sea structure comprising a polypropylene (A) as a sea component and a copolymerized polyester (B) with cyclohexanedicarboxylic acid copolymerized as an island component, wherein a dispersion diameter of the island component in a lateral fiber cross section of the fiber is 30 to 1000 nm, and
cyclohexanedicarboxylic acid is copolymerized at a ratio of 10 to 100 mol % relative to all dicarboxylic acid components in the copolymerized polyester (B).

2. The dyeable polypropylene fiber according to claim 1, further comprising a compatibilizer (C).

3. The dyeable polypropylene fiber according to claim 2, wherein the compatibilizer (C) is one or more compounds selected from the group consisting of a polyolefin-based resin, an acrylic resin, a styrene-based resin, and a conjugated diene-based resin each containing at least one functional group selected from the group consisting of an acid anhydride group, a carboxyl group, a hydroxyl group, an epoxy group, an amino group, and an imino group.

4. The dyeable polypropylene fiber according to claim 2, wherein the compatibilizer (C) is a styrene-ethylene-butylene-styrene copolymer containing at least one functional group selected from an amino group and an imino group.

5. The dyeable polypropylene fiber according to claim 2, wherein the fiber contains the copolymerized polyester (B) in an amount of 3.0 to 20.0 parts by weight per 100 parts by weight in total of the polypropylene (A), the copolymerized polyester (B) and the compatibilizer (C).

6. The dyeable polypropylene fiber according to claim 2, wherein the fiber contains the compatibilizer (C) in an amount of 0.1 to 10.0 parts by weight per 100 parts by weight in total of the polypropylene (A), the copolymerized polyester (B) and the compatibilizer (C).

7. The dyeable polypropylene fiber according to claim 1, wherein the maximum temperature of a sample of the fiber is 155° C. or less during isothermal holding of the sample at 150° C. for 100 hours in a test according to the oxidative exotherm test method (acceleration method) of a polypropylene fiber specified by Japan Chemical Fibers Association.

8. The dyeable polypropylene fiber according to claim 1, wherein the color fastness to nitrogen oxides measured according to JIS L0855 is class 4 or higher.

9. The dyeable polypropylene fiber according to claim 1, wherein the phenolic yellowing measured according to ISO 105-X18 is class 3 or higher.

10. The dyeable polypropylene fiber according to claim 1, further comprising an antioxidant.

11. The dyeable polypropylene fiber according to claim 10, wherein the antioxidant is at least one species selected from the group consisting of a phenol-based compound, a phosphorus-based compound, and a hindered amine-based compound.

12. The dyeable polypropylene fiber according to claim 11, wherein the hindered amine-based compound is an aminoether type hindered amine-based compound.

13. A fibrous structure at least partly comprising the dyeable polypropylene fiber according to claim 1.

* * * * *